(12) United States Patent
Mace et al.

(10) Patent No.: US 10,698,677 B2
(45) Date of Patent: Jun. 30, 2020

(54) METHOD AND SYSTEM FOR LIFECYCLE MANAGEMENT OPTIMIZATION

(71) Applicant: EMC IP Holding Company LLC, Hopkinton, MA (US)

(72) Inventors: Donald Mace, Hopkinton, MA (US); Xiaoye Jiang, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/971,343

(22) Filed: May 4, 2018

(65) Prior Publication Data
US 2019/0340005 A1    Nov. 7, 2019

(51) Int. Cl.
| | |
|---|---|
| *G06F 8/65* | (2018.01) |
| *G06F 9/455* | (2018.01) |
| *G06F 8/61* | (2018.01) |
| *H04L 29/08* | (2006.01) |
| *G06F 8/71* | (2018.01) |

(52) U.S. Cl.
CPC .................. *G06F 8/65* (2013.01); *G06F 8/61* (2013.01); *G06F 8/71* (2013.01); *G06F 9/45558* (2013.01); *H04L 67/34* (2013.01)

(58) Field of Classification Search
CPC ........ G06F 8/71; G06F 8/60–66; G06F 8/654; G06F 9/45558; G06F 9/45533; G06F 2009/45595; G06F 2009/45591; G06F 2009/4557; G06F 2009/45587; G06F 3/0649; H04L 67/34; H04L 41/081
See application file for complete search history.

(56) References Cited

U.S. PATENT DOCUMENTS

| | | | | |
|---|---|---|---|---|
| 7,568,195 | B2* | 7/2009 | Markley | G06F 8/65 717/170 |
| 8,719,815 | B1* | 5/2014 | Park | G06F 8/61 717/174 |
| 9,606,788 | B2* | 3/2017 | Nachimuthu | G06F 8/65 |
| 2004/0003266 | A1* | 1/2004 | Moshir | G06F 8/62 713/191 |
| 2005/0132350 | A1* | 6/2005 | Markley | G06F 8/65 717/168 |
| 2015/0317147 | A1* | 11/2015 | Nachimuthu | G06F 8/65 717/173 |

* cited by examiner

*Primary Examiner* — Todd Aguilera
(74) *Attorney, Agent, or Firm* — Chamberlain, Hrdlicka, White, Williams & Aughtry

(57) ABSTRACT

A method and system for lifecycle management optimization. Specifically, the method and system disclosed herein eliminate the performance of exhaustive pre-checks, which pertain to determining compatibility between downloaded upgrade packages for installed components in a computing system and a current state of the computing system. Traditional approaches to performing lifecycle management operations entail downloading upgrade packages first, followed by the performance of the exhaustive pre-checks thereafter. In contrast, the method and system disclosed herein perform the pre-checks first, through a processing of fingerprints and, subsequently, based on the outcome of the pre-checks, allowing the upgrade packages to be downloaded or providing feedback to mitigate any issues that may arise.

19 Claims, 31 Drawing Sheets

METHOD AND SYSTEM FOR LIFECYCLE MANAGEMENT OPTIMIZATION

BACKGROUND

The traditional approach for managing lifecycle operations in an information technology environment entails downloading upgrade packages first, followed by performing a pre-check of installed component state with the downloaded upgrade packages. In the event of pre-check failures, due to incompatibilities identified between a downloaded upgrade package and one or more installed component states, however, the action of downloading the upgrade package first proves to be costly in terms of time and user experience.

Other aspects of the invention will be apparent from the following description and the appended claims.

DETAILED DESCRIPTION

Figure 1:
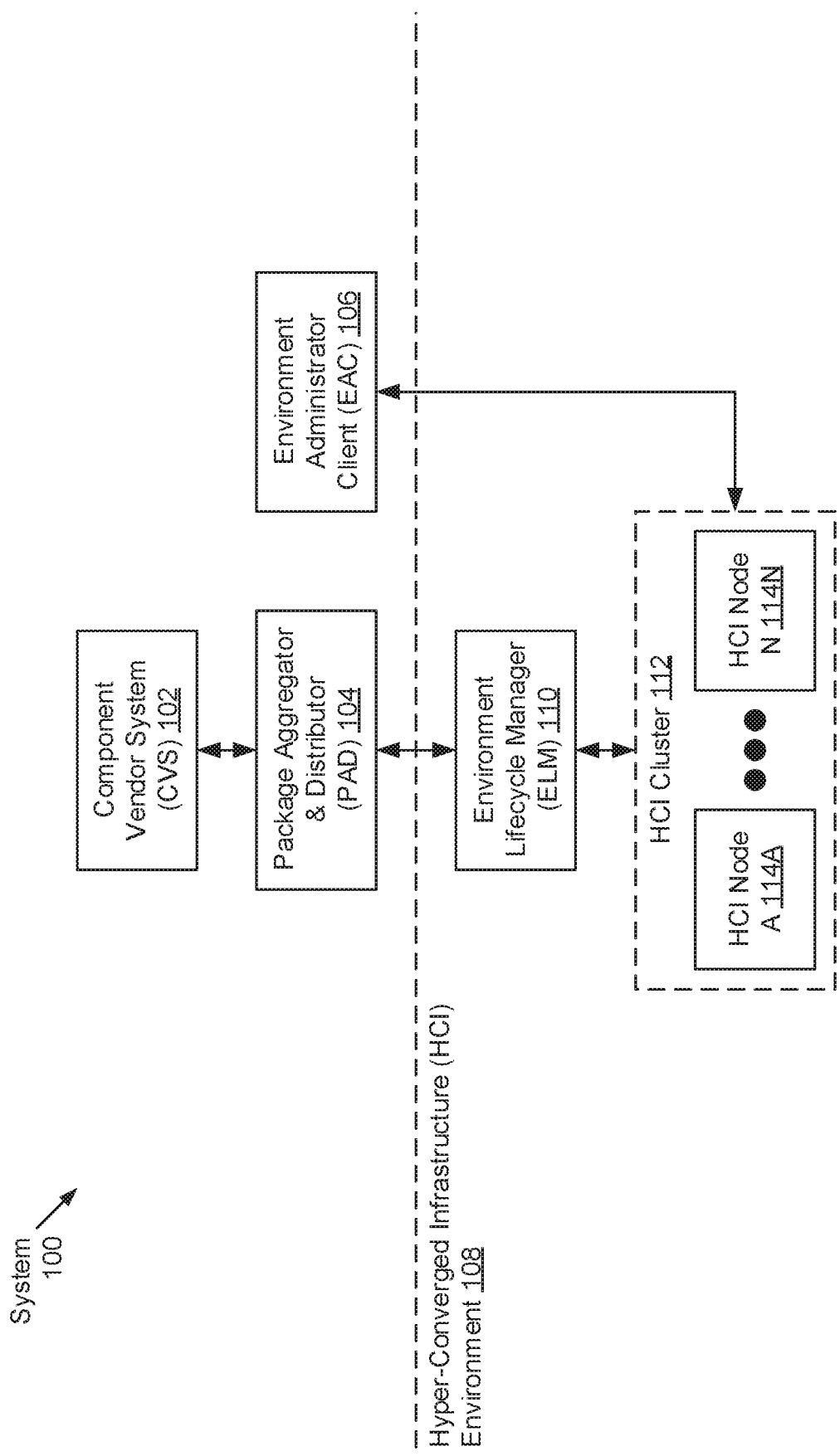
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-22, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for lifecycle management optimization. Specifically, one or more embodiments of the invention eliminate the performance of exhaustive pre-checks, which pertain to determining compatibility between downloaded upgrade packages for installed components in a computing system and a current state of the computing system. Traditional approaches to performing lifecycle management operations entail downloading upgrade packages first, followed by the performance of the exhaustive pre-checks thereafter. When the pre-checks result in failure, indicative that the current state of the computing system is not suitable or is not a candidate for the downloaded upgrade packages, the invested time and user experience directed to performing the lifecycle management operations is forfeited. In contrast, one or more embodiments of the invention perform the pre-checks first, through a processing of fingerprints and, subsequently, based on the outcome of the pre-checks, allowing the upgrade packages to be downloaded or providing feedback to mitigate any issues that may arise. Accordingly, through embodiments of the invention, time and experience expended for lifecycle management operations are optimized, thereby reducing the cost and complexity associated with the performance of ever-increasing pre-checks within ever more complicated, hyper-converged computing systems.

FIG. 1 shows a system in accordance with one or more embodiments of the invention. The system (100) may include a component vendor system (CVS) (102), a package aggregator and distributor (PAD) (104), an environment administrator client (EAC) (106), and a hyper-converged infrastructure (HCI) environment (108). Each of these components is described below.

In one embodiment of the invention, the aforementioned components may be directly or indirectly connected to one another through a network (not shown) (e.g., a local area network (LAN), a wide area network (WAN) such as the Internet, a mobile network, or any other network). The network may be implemented using any combination of wired and/or wireless connections. In embodiments in which the aforementioned components are indirectly connected, there may be other networking components or systems (e.g., switches, routers, gateways, etc.) that facilitate communications and/or information exchange. Further, the aforementioned components may communicate with one another using any combination of existing and future-developed wired and/or wireless communication protocols.

In one embodiment of the invention, the CVS (102) may be any computing system (see e.g., FIG. 22) operated by a developer or administrator of any component installed on one or more HCI nodes (114A-114N) (described below) of the HCI environment (108). A component may refer to a physical device (i.e., hardware) or a logical intelligence (i.e., software and/or firmware) that may be installed on a HCI node (114A-114N). Further, a developer or administrator of a component may refer to an individual, a group of individuals, or an entity who may be responsible for at least designing, implementing, testing, and maintaining the component. With respect to maintenance of a component, the developer or administrator may be responsible for coding and/or deploying upgrades, patches, and/or fixes directed to improving an operation of the component. Accordingly, the CVS (102) may include functionality to provide these upgrades, patches, and/or fixes (i.e., collectively disclosed herein as packages or lifecycle packages (LPs)) to the PAD (104), with which the CVS (102) may be operatively connected. One of ordinary skill will appreciate that the CVS (102) may perform other functionalities without departing from the scope of the invention. Examples of the CVS (102) include, but are not limited to, a desktop computer, a laptop computer, a tablet computer, a server, a mainframe, a smartphone, or any other computing system similar to the exemplary computing system shown in FIG. 22.

In one embodiment of the invention, the PAD (104) may be a package aggregation and distribution platform that services one or more HCI environments (108). The PAD (104) may be implemented using one or more servers (not shown). Each server may be a physical server (i.e., in a datacenter) or a virtual server (i.e., residing in a cloud computing environment). In one embodiment of the invention, the PAD (104) may be implemented using one or more computing systems similar to the exemplary computing system shown in FIG. 22. Furthermore, the PAD (104) may include functionality to: receive, from one or more CVSs (102), packages (i.e., upgrades, patches, and/or fixes) directed to one or more components; identify which packages may be relevant to each respective HCI environment (108) that the PAD (104) may service; and relay those relevant packages, to each HCI environment (108), for distribution across one or more HCI nodes (114A-114N) therein.

In one embodiment of the invention, the EAC (106) may be any computing system (see e.g., FIG. 22) operated by an administrator of the HCI environment (108). An administrator of the HCI environment (108) may be an individual, a group of individuals, or an entity who may be responsible for overseeing operations and maintenance pertinent to the hardware, software, and/or firmware elements of the HCI environment (108). Further, the EAC (106) may include functionality to interact with the HCI environment (108) through the submission of web application programming interface (API) requests and the receiving of corresponding web API responses. One of ordinary skill will appreciate that the EAC (106) may perform other functionalities without departing from the scope of the invention. Examples of the EAC (106) include, but are not limited to, a desktop computer, a laptop computer, a tablet computer, a server, a mainframe, a smartphone, or any other computing system similar to the exemplary computing system shown in FIG. 22.

In one embodiment of the invention, the HCI environment (108) may refer to datacenter and/or cloud computing infrastructure (i.e., a configuration of various information technology (IT) components (e.g., servers, storage, networking, management, etc.)) that reflects hyper-convergent architecture. Hyper-convergent architecture may entail the software-centric or software-defined integration of virtualization, compute, storage, and networking resources into a single solution. The solution may take form as a software stack, a hardware appliance, or a combination thereof. Further, the HCI environment (108) may be implemented using an environment lifecycle manager (ELM) (110) operatively connected to at least one HCI cluster (112). Each of these components is described below.

In one embodiment of the invention, the ELM (110) may be a lifecycle management (LCM) service available to, or a LCM feature available on, the HCI environment (108). In one embodiment of the invention, the ELM (110) may be implemented using one or more servers (not shown). Each server may be a physical server (i.e., in a datacenter), a virtual server (i.e., that may be cloud-based), or a combination thereof. In another embodiment of the invention, the ELM (110) may be implemented on one or more computing systems similar to the exemplary computing system shown in FIG. 22. The ELM (110) may be operatively connected to all HCI nodes (114A-114N) of the at least one HCI cluster (112) in the HCI environment (108). Furthermore, the ELM (110) may include functionality to, in accordance with one or more embodiments of the invention: process package packs (PPs) (see e.g., FIGS. 16A and 16B); issue available package notifications (APNs) (see e.g., FIG. 17); and process package requests (see e.g., FIGS. 20A-20D). The ELM (110) is described in further detail below with respect to FIG. 2.

In one embodiment of the invention, a HCI cluster (112) may refer to a group of linked HCI nodes (114A-114N), which may be configured to share resources. The shared resources may include at least compute, storage, and/or network resources. Further, the sharing of any resource may entail virtualizing the resource in each HCI node (114A-114N) to create a logical pool of that resource, which, subsequently, may be provisioned, as needed, across all HCI nodes (114A-114N) in the HCI cluster (112). In one embodiment of the invention, a HCI cluster (112) may entail a group of linked HCI nodes (114A-114N) that collectively work towards servicing a specific usage scenario. Often, a HCI cluster (112) may encompass at least two or three HCI nodes (114A-114N) to sustain high availability and/or redundancy. In one embodiment of the invention, a HCI node (114A-114N) may refer to a physical appliance—e.g., a server (not shown) or any computing system similar to the exemplary computing system shown in FIG. 22. Further, each HCI node (114A-114N) in a HCI cluster (112) may manage a set of tasks that implement at least a portion of the specific usage scenario that which the HCI cluster (112) may be servicing. HCI nodes (114A-114N) are described in further detail below with respect to FIG. 7.

While FIG. 1 shows a configuration of components, other system configurations may be used without departing from the scope of the invention. For example, the system (100) may further include: additional CVSs (102) operatively connected to the PAD (104); additional EACs (106) operatively connected to the HCI environment (108); and additional HCI environments (108) that which the PAD (104) services and is operatively connected.

Figure 2:
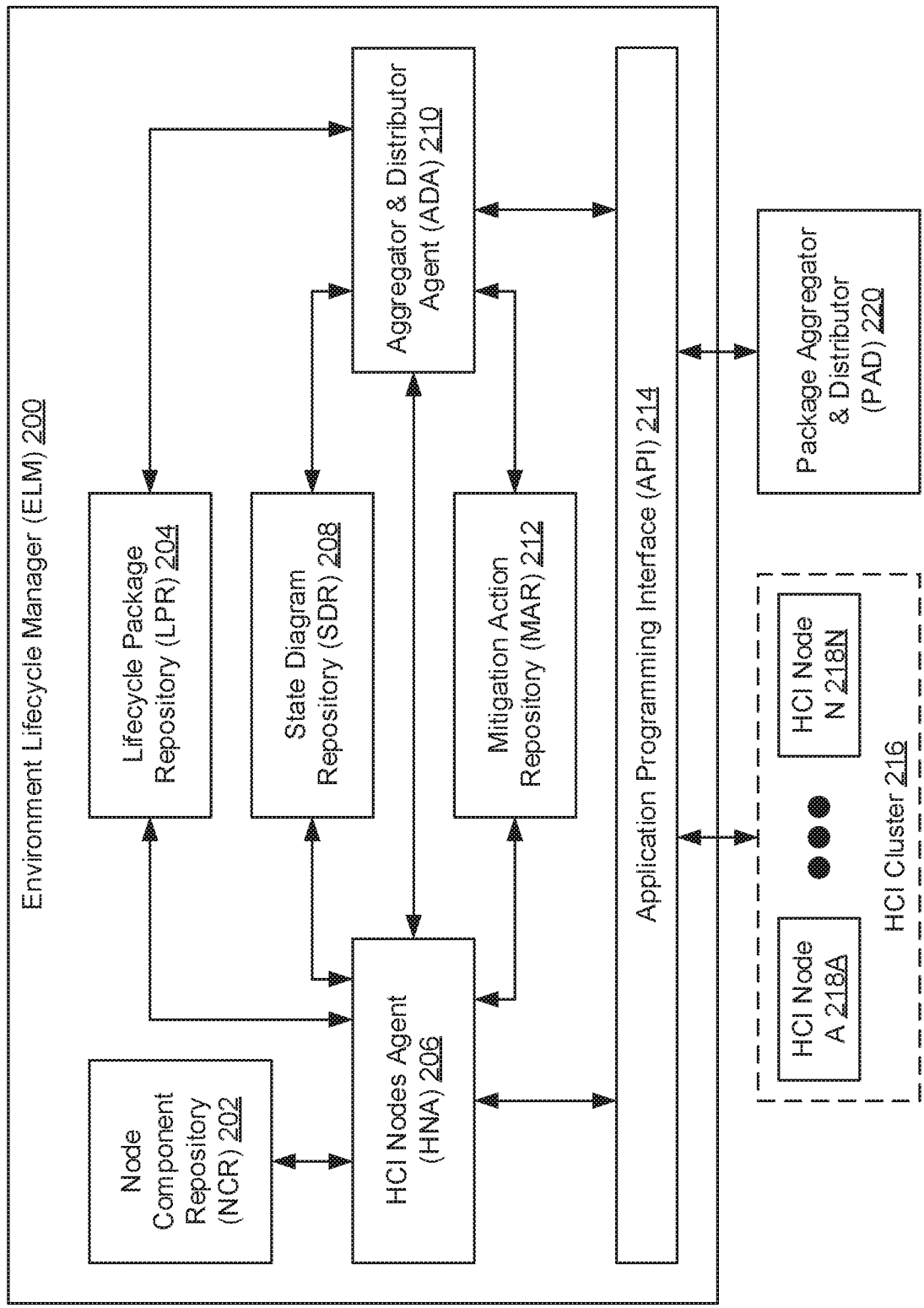
FIG. 2 shows an environment lifecycle manager in accordance with one or more embodiments of the invention.

FIG. 2 shows an environment lifecycle manager (ELM) in accordance with one or more embodiments of the invention. As described above, the ELM (200) may be a lifecycle management (LCM) service available to, or a LCM feature available on, a hyper-converged infrastructure (HCI) environment (not shown). Accordingly, the ELM (200) may include a node component repository (NCR) (202), a lifecycle package repository (LPR) (204), a HCI nodes agent (HNA) (206), a state diagram repository (SDR) (208), an aggregator and distributor agent (ADA) (210), a mitigation action repository (MAR) (212), and an application programming interface (API) (214). Each of these components is described below.

In one embodiment of the invention, the NCR (202) may be a storage system or media for consolidating node-component mappings (described below). The NCR (202) may be implemented across one or more physical and/or virtual storage units or devices, which may or may not be of the same type or co-located in a same computing system (see e.g., FIG. 22). Furthermore, the information consolidated in the NCR (202) may be arranged using any storage mechanism (e.g., a filesystem, a database, a collection of tables, etc.). In one embodiment of the invention, the NCR (202) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). In one embodiment of the invention, the NCR (202) may be implemented using memristor technology. The NCR (202) is described in further detail below with respect to FIG. 3.

In one embodiment of the invention, the LPR (204) may be a storage system or media for consolidating lifecycle package information (described below). The LPR (204) may be implemented across one or more physical and/or virtual storage units or devices, which may or may not be of the same type or collocated in a same computing system (see e.g., FIG. 22). Furthermore, the information consolidated in the LPR (204) may be arranged using any storage mechanism (e.g., a filesystem, a database, a collection of tables, etc.). In one embodiment of the invention, the LPR (204) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). In one embodiment of the invention, the LPR (204) may be implemented using memristor technology. The LPR (204) is described in further detail below with respect to FIG. 5.

In one embodiment of the invention, the HNA (206) may be a computer program or process (i.e., an instance of a computer program) that executes on the underlying hardware of the ELM (200). Specifically, the HNA (206) may be a computer program or process tasked with managing any and all interactions between the ELM (200) and one or more HCI nodes (218A-218N) of a HCI cluster (216). To that end, the HNA (206) may include functionality to, in accordance with one or more embodiments of the invention: issue available package notifications (APNs) (see e.g., FIG. 17) to one or more HCI nodes (218A-218N); and process package requests (see e.g., FIGS. 20A-20D) from one or more HCI nodes (218A-218N).

In one embodiment of the invention, the SDR (208) may be a storage system or media for consolidating state diagram information (SDI) (described below) for various components installed across one or more HCI nodes (218A-218N). The SDR (208) may be implemented across one or more physical and/or virtual storage units or devices, which may or may not be of the same type or co-located in a same computing system (see e.g., FIG. 22). Furthermore, the information consolidated in the SDR (208) may be arranged using any storage mechanism (e.g., a filesystem, a database, a collection of tables, etc.). In one embodiment of the invention, the SDR (208) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). In one embodiment of the invention, the SDR (208) may be implemented using memristor technology. The SDR (208) is described in further detail below with respect to FIG. 4A.

In one embodiment of the invention, the ADA (210) may be a computer program or process (i.e., an instance of a computer program) that executes on the underlying hardware of the ELM (200). Specifically, the ADA (210) may be a computer program or process tasked with managing any and all interactions between the ELM (200) and a package aggregator and distributor (PAD) (220) (see e.g., FIG. 1). To that end, the ADA (210) may include functionality to, in accordance with one or more embodiments of the invention: process package packs (PPs) (see e.g., FIGS. 16A and 16B) obtained from the PAD (220).

In one embodiment of the invention, the MAR (212) may be a storage system or media for consolidating mitigation action information (described below). The MAR (212) may be implemented across one or more physical and/or virtual storage units or devices, which may or may not be of the same type or collocated in a same computing system (see e.g., FIG. 22). Furthermore, the information consolidated in the MAR (212) may be arranged using any storage mechanism (e.g., a filesystem, a database, a collection of tables, etc.). In one embodiment of the invention, the MAR (212)

may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). In one embodiment of the invention, the MAR (212) may be implemented using memristor technology. The MAR (212) is described in further detail below with respect to FIG. 6.

In one embodiment of the invention, the API (214) may be a hardware and/or software implemented construct that employs a set of subroutine definitions, protocols, and/or tools for enabling communications and/or information exchange between the ELM (200) and other entities such as, for example, one or more HCI nodes (218A-218N) of a HCI cluster (216) and the PAD (220). The API (214) may include functionality to: receive API requests from these other entities; delegate API requests for processing to appropriate handlers (i.e., the HNA (206) or the ADA (210)); obtain, based on this processing, outcomes from these appropriate handlers; encode these outcomes to generate API responses; transmit these API responses to the other entities; obtain queries from the aforementioned appropriate handlers; encode these queries to generate other API requests; issue these other API requests to other entities; obtain other API responses, including queried information, to these other API requests from other entities; and directing the queried information to the appropriate handlers. One of ordinary skill will appreciate that the API (214) may perform other functionalities without departing from the scope of the invention. Further, by way of an example, the API (214) may be a web API that may be accessed through an assigned web address (e.g., a uniform resource locator (URL)) and a WAN (e.g., Internet) connection.

Figure 3:
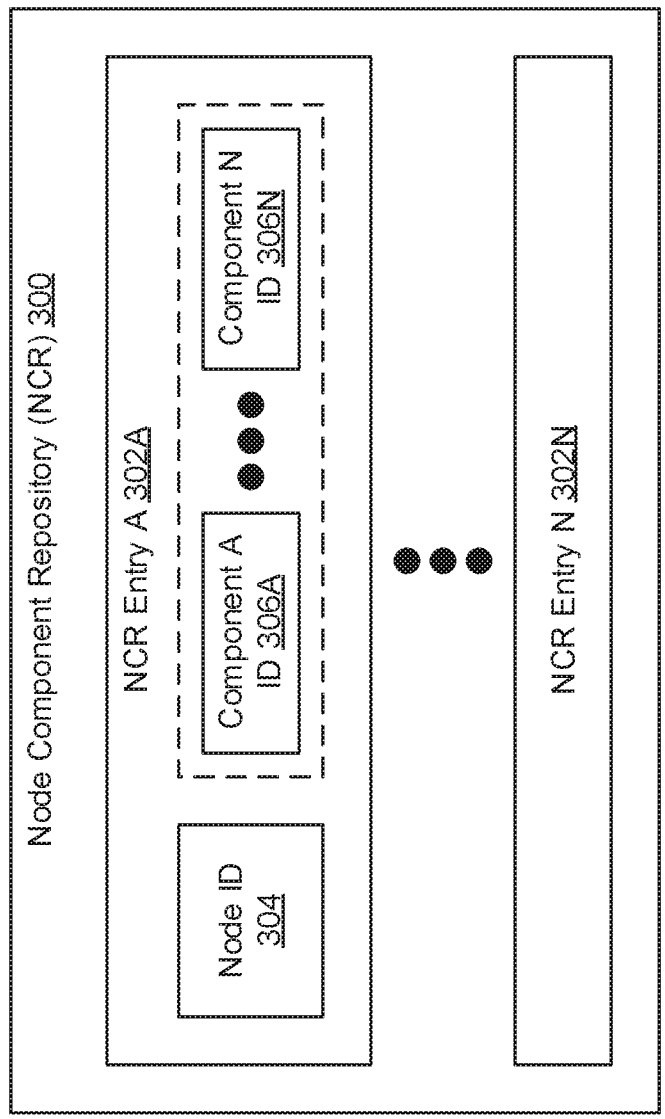
FIG. 3 shows a node component repository in accordance with one or more embodiments of the invention.

FIG. 3 shows a node component repository (NCR) in accordance with one or more embodiments of the invention. As described above, the NCR (300) may be a storage system or media for consolidating node-component mappings. A node-component mapping may refer to information that tracks the various components installed on any particular hyper-converged infrastructure (HCI) node. Further, the NCR (300) may be maintained, by a HCI node agent (HNA) executing on an environment lifecycle manager (ELM) (see e.g., FIG. 2), using information obtained from one or more HCI nodes. Moreover, the NCR (300) may consolidate node-component mappings, respective to each HCI node operatively connected to the ELM, as one or more NCR entries (302A-302N). Each NCR entry (302A-302N) may be a data container within which various related items of information reside. These related items of information may include a node identifier (ID) (304) and a set of one or more component IDs (306A-306N). Each of these items of information is described below.

In one embodiment of the invention, the node ID (304) may refer to a string of characters (e.g., letters, numbers, symbols, etc.) that uniquely identify a HCI node. Further, the node ID (304) may entail any number and/or combination of characters. By way of an example, the node ID (304) may be represented through an alphanumeric tag or a N-bit integer (where N>0) expressed in hexadecimal notation.

In one embodiment of the invention, a component ID (306A-306N) may refer to a string of characters (e.g., letters, numbers, symbols, etc.) that uniquely identify a component installed on the HCI node associated with the node ID (304). A component may refer to a physical device (i.e., hardware) or a logical intelligence (i.e., software and/or firmware) that may be installed on the HCI node. Further, the component ID (306A-306N) may entail any number and/or combination of characters. By way of an example, the component ID (306A-306N) may be represented through an alphanumeric tag or a N-bit integer (where N>0) expressed in hexadecimal notation.

Figure 4A:
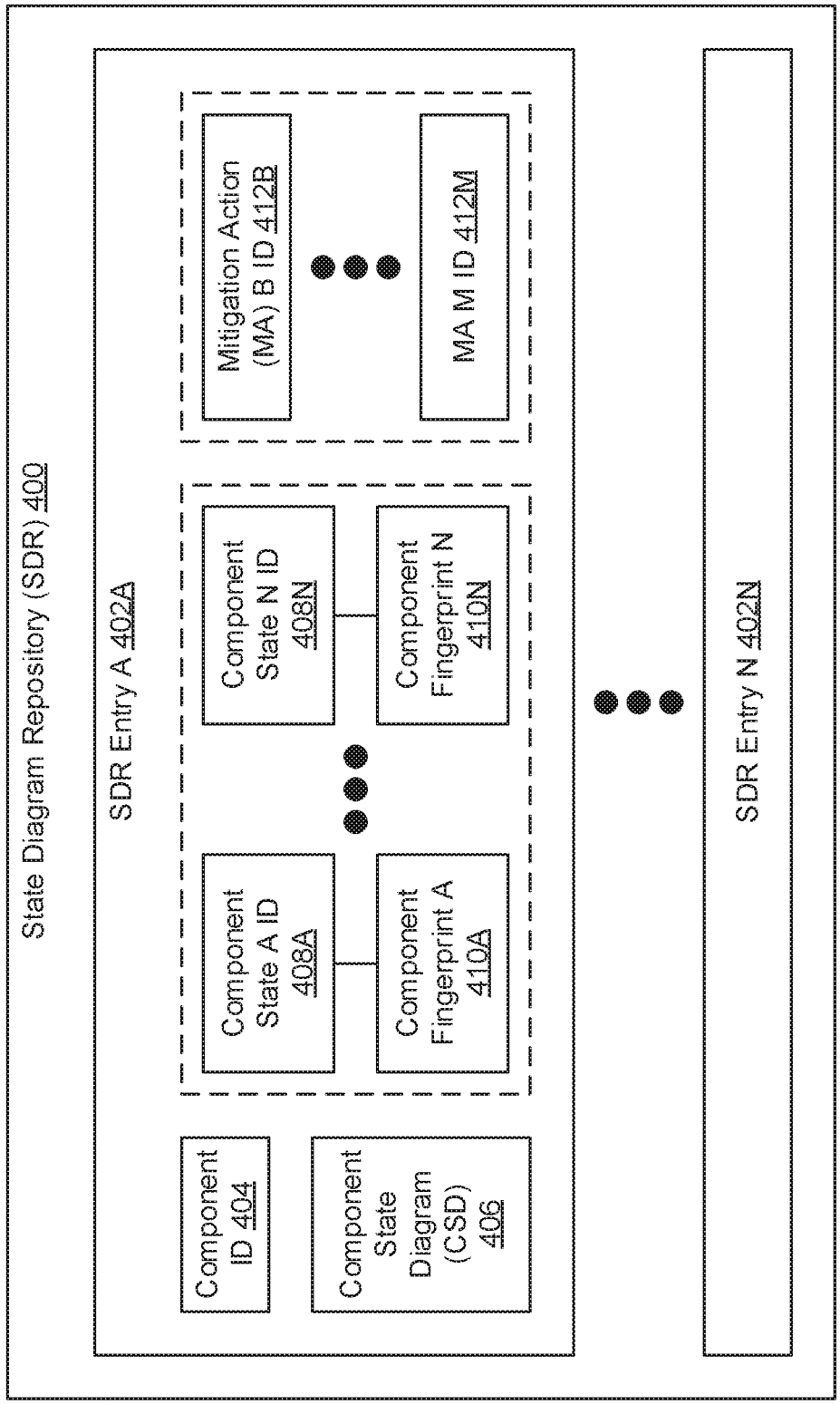
FIG. 4A shows a state diagram repository in accordance with one or more embodiments of the invention.

FIG. 4A shows a state diagram repository (SDR) in accordance with one or more embodiments of the invention. As described above, the SDR (400) may be a storage system or media for consolidating state diagram information (SDI) for one or more hyper-converged infrastructure (HCI) nodes. SDI may pertain to a component state diagram (CSD) (406) (described below) and associated metadata directed to any particular component installed on one or more HCI nodes. Further, the SDR (400) may be maintained, by a aggregator and distributor agent (ADA) executing on an environment lifecycle manager (ELM) (see e.g., FIG. 2), using information obtained from a package aggregator and distributor (PAD) (see e.g., FIG. 1). Moreover, the SDR (400) may consolidate SDI, respective to each component installed on one or more HCI nodes operatively connected to the ELM, as one or more SDR entries (402A-402N). Each SDR entry (402A-402N) may be a data container within which various related items of information reside. These related items of information may include a component identifier (ID) (404), a CSD (406), one or more component state-fingerprint mappings (408A/410A-408N/410N), and one or more mitigation action (MA) IDs (412B-412M). Each of these items of information is described below.

In one embodiment of the invention, the component ID (404) may refer to a string of characters (e.g., letters, numbers, symbols, etc.) that uniquely identify a component installed on any HCI node. A component may refer to a physical device (i.e., hardware) or a logical intelligence (i.e., software and/or firmware) that may be installed on the HCI node. Further, the component ID (404) may entail any number and/or combination of characters. By way of an example, the component ID (404) may be represented through an alphanumeric tag or a N-bit integer (where N>0) expressed in hexadecimal notation.

In one embodiment of the invention, the CSD (406) may be a state transition graph pertaining to the component associated with the component ID (404). Specifically, the CSD (406) may refer to a diagram of nodes (or vertices), representative of states, and directed edges, representative of mitigation actions, that connect these nodes, thereby collectively illustrating a lifecycle management (LCM) history of a component. An example CSD (406) is portrayed and further described in FIG. 4B.

In one embodiment of the invention, a component state-fingerprint mapping (408A/410A-408N/410N) may refer to information that associates a component state, depicted in the CSD (406), to a component fingerprint derived from metadata pertaining to the component (associated with the component ID (404)) while at that component state. Specifically, each component state-fingerprint mapping may associate a component state ID (408A-408N) to a component fingerprint ID (410A-410N). Each of these items of information is described below.

In one embodiment of the invention, a component state ID (408A-408N) may refer to a string of characters (e.g., letters, numbers, symbols, etc.) that uniquely identify a component state of the component associated with the component ID (404). A component state may refer to a particular condition or version of a component. Further, the component state ID (408A-408N) may entail any number and/or combination of characters. By way of an example, the component state ID (408A-408N) may be represented through an alphanumeric tag or a N-bit integer (where N>0) expressed in hexadecimal notation.

In one embodiment of the invention, a component fingerprint ID (410A-410N) may refer to a string of characters (e.g., letters, numbers, symbols, etc.) that uniquely identify a component fingerprint of the component associated with the component ID (404). A component fingerprint may refer to a digital signature derived from component metadata pertaining to the component state associated with the component state ID (408A-408N). Further, the component fingerprint ID (410A-410N) may entail any number and/or combination of characters. By way of an example, the component fingerprint ID (410A-410N) may be represented through an alphanumeric tag or a N-bit integer (where N>0) expressed in hexadecimal notation.

In one embodiment of the invention, a MA ID (412B-412M) may refer to a string of characters (e.g., letters, numbers, symbols, etc.) that uniquely identify a mitigation action (MA) depicted in the CSD (406). In one embodiment of the invention, a MA may refer to an application of one or more packages (i.e., upgrades, patches, and/or fixes) to the component (associated with the component ID (404)) to transition a state of the component from one component state to another component state. In another embodiment of the invention, a MA may refer to any intervention action (e.g., contacting helpdesk support), which may facilitate the transition of a state of the component from one component state to another component state. Further, the MA ID (4102B-412M) may entail any number and/or combination of characters. By way of an example, the MA ID (412B-412M) may be represented through an alphanumeric tag or a N-bit integer (where N>0) expressed in hexadecimal notation.

Figure 4B:
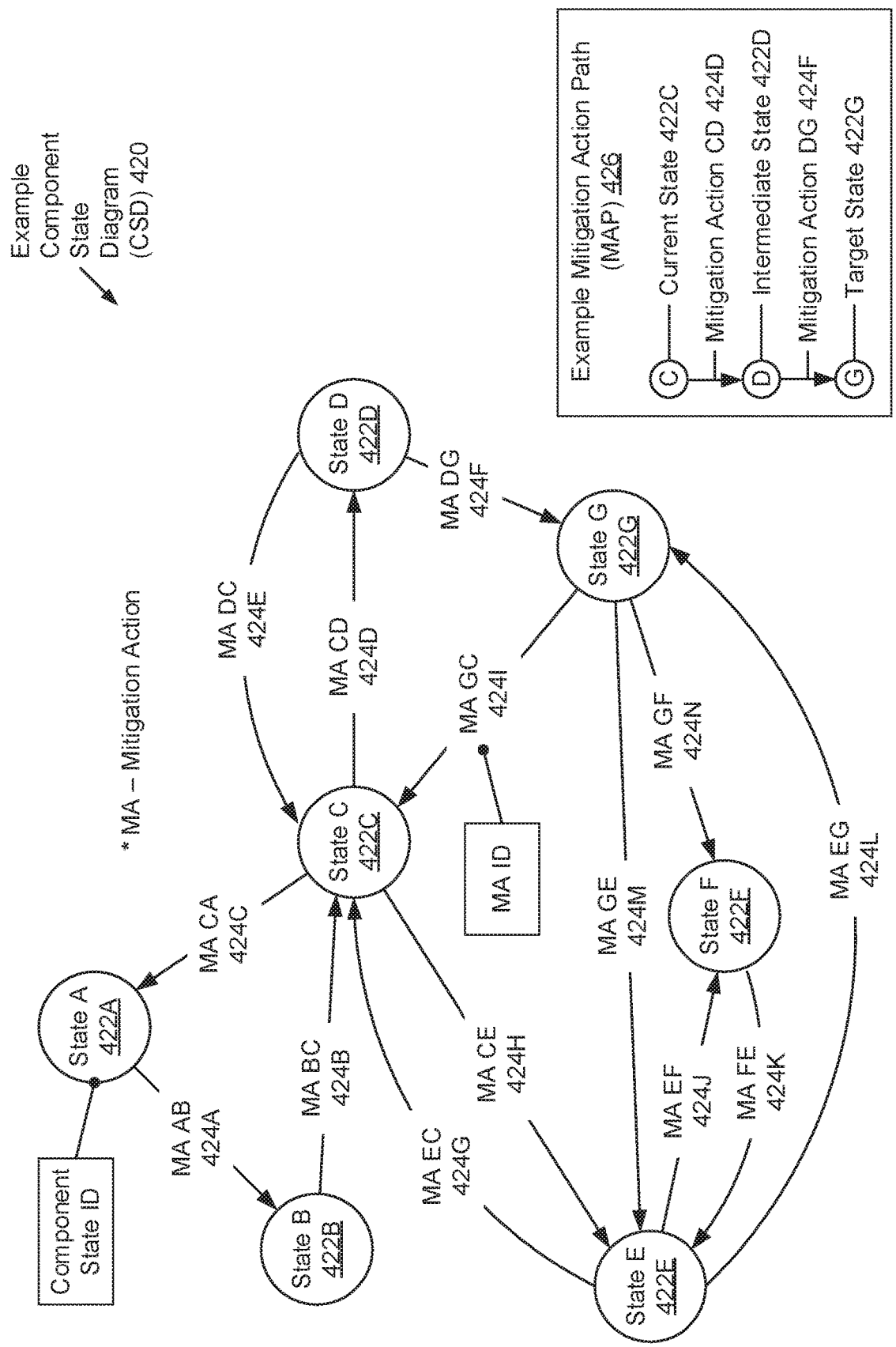
FIG. 4B shows an example component state diagram in accordance with one or more embodiments of the invention.

FIG. 4B shows an example component state diagram (CSD) in accordance with one or more embodiments of the invention. As described above, a CSD (420) may be a state transition graph pertaining to a component. Specifically, the CSD (420) may refer to a diagram of nodes (or vertices), representative of states (422A-422G), and directed edges, representative of mitigation actions (424A-424N), that connect these nodes, thereby collectively illustrating a lifecycle management (LCM) history of the component.

In one embodiment of the invention, each node (or state) depicted in the CSD (420) may reference a component state ID (408A-408N) specified in a SDR entry (402A-402N) within which the CSD (406/420) may also be specified. Furthermore, one or more directed edges (or mitigation actions) depicted in the CSD (420) may reference a mitigation action (MA) ID (412B-412M) specified in the SDR entry (402A-402N) within which the CSD (406/420) may also be specified.

FIG. 4B also shows an example mitigation action path (MAP) (426) in accordance with one or more embodiments of the invention. A MAP (426) may refer to one or more mitigation action (MA) IDs (depicted as one or more edges in the CSD (420)), where the one or more edges may form a directed path from one component state ID (depicted as one node in the CSD (420)) to another component state ID (depicted as another node in the CSD (420)). For example, based on the CSD (420), a MAP (426) between State C (422C) (representative of a current state of a component) and State G (422G) (representative of a target state of the component), may be formed through two edges—i.e., (a) MA CD (424D), which leads to an intermediate State D (422D); and (b) MA DG (424F), which leads to the target State G (422G).

Figure 5:
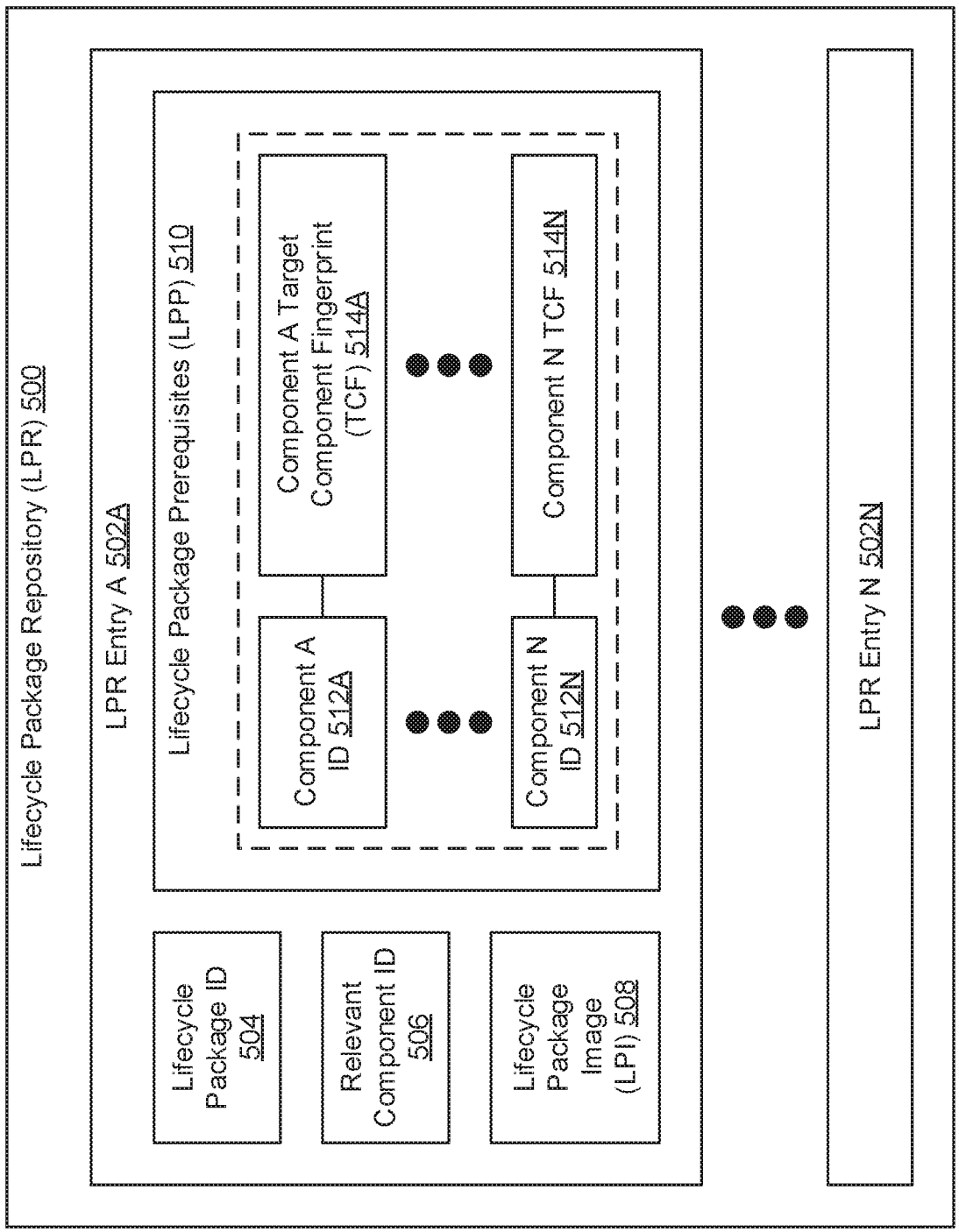
FIG. 5 shows a lifecycle package repository in accordance with one or more embodiments of the invention.

FIG. 5 shows a lifecycle package repository (LPR) in accordance with one or more embodiments of the invention. As described above, the LPR (500) may be a storage system or media for consolidating lifecycle package information. Lifecycle package information may pertain to a lifecycle package image (508) (described below) and associated metadata directed to any particular lifecycle package (LP). A LP may refer to a data object or structure directed to any particular upgrade, a patch, and/or a fix for any component installed on one or more hyper-converged infrastructure (HCI) nodes. Further, the LPR (500) may be maintained, by a aggregator and distributor agent (ADA) executing on an environment lifecycle manager (ELM) (see e.g., FIG. 2), using information obtained from a package aggregator and distributor (PAD) (see e.g., FIG. 1). Moreover, the LPR (500) may consolidate lifecycle package information, respective to one or more LPs available for download and installation, as one or more LPR entries (502A-502N). Each LPR entry (502A-502N) may be a data container within which various related items of information reside. These related items of information may include a lifecycle package ID (504), a relevant component ID (506), a LPI (508), and a set of one or more lifecycle package prerequisites (LPPs) (510). Each of these items of information is described below.

In one embodiment of the invention, the lifecycle package ID (504) may refer to a string of characters (e.g., letters, numbers, symbols, etc.) that uniquely identify a lifecycle package. As mentioned above, a lifecycle package may refer to a data object or structure directed to any particular upgrade, a patch, and/or a fix for any component installed on one or more HCI nodes. Further, the lifecycle package ID (504) may entail any number and/or combination of characters. By way of an example, the lifecycle package ID (504) may be represented through an alphanumeric tag or a N-bit integer (where N>0) expressed in hexadecimal notation.

In one embodiment of the invention, the relevant component ID (506) may refer to a string of characters (e.g., letters, numbers, symbols, etc.) that uniquely identify a component for which the lifecycle package (associated with the lifecycle package ID (504)) is directed. A component may refer to any physical device (i.e., hardware) or any logical intelligence (i.e., software and/or firmware) that may be installed on one or more HCI nodes. Further, the relevant component ID (506) may entail any number and/or combination of characters. By way of an example, the relevant component ID (506) may be represented through an alphanumeric tag or a N-bit integer (where N>0) expressed in hexadecimal notation.

In one embodiment of the invention, the LPI (508) may refer to any and all information necessary to implement the upgrade, patch, and/or fix to which the LPI (508) is directed. For example, the LPI (508) may encompass one or more binary files, representative of computer readable program code that may be interpreted and executed by a component, as well as lifecycle package metadata (entailing descriptive information pertaining to the lifecycle package with which the LPI (508) is associated). By way of examples, lifecycle package metadata may include, but is not limited to, a version number associated with the lifecycle package, a release data associated with the lifecycle package, a component name pertaining to a component to which the lifecycle package is directed, and a file size associated with the lifecycle package.

In one embodiment of the invention, a LPP (510) may pertain to a required (or prerequisite) component state, of another component (i.e., a component other than the component associated with the relevant component ID (506)), which must be met in order to release the lifecycle package (associated with the lifecycle package ID (504)) to a requesting HCI node. Further, a LPP (510) may take form as a mapping associating a component (or prerequisite component) ID (512A-512N) (associated with the aforementioned other component—i.e., a prerequisite component) and a target component fingerprint (TCF) (514A-514N) directed to the aforementioned required (or requisite) component state of the other component. Each of these items of information is described below.

In one embodiment of the invention, a prerequisite component ID (512A-512N) may refer to a string of characters (e.g., letters, numbers, symbols, etc.) that uniquely identify a prerequisite component (i.e., a component other than the component associated with the relevant component ID (506)). A prerequisite component may be a physical device (i.e., hardware) or a logical intelligence (i.e., software and/or firmware) that must be installed on a HCI node prior to, and in order for, the lifecycle package (associated with the lifecycle ID (504)) to install without issues. Further, the prerequisite component ID (512A-512N) may entail any number and/or combination of characters. By way of an example, the prerequisite component ID (512A-512N) may be represented through an alphanumeric tag or a N-bit integer (where N>0) expressed in hexadecimal notation.

In one embodiment of the invention, a TCF (514A-514N) may refer to a digital signature associated with a target state for a prerequisite component (associated with a prerequisite component ID (512A-512N)) of the lifecycle package (associated with the lifecycle package ID (504)). Further, a target state may refer to a required (or prerequisite) condition or version in which the prerequisite component must be, in order to facilitate integration of the lifecycle package requested by a HCI node.

Figure 6:
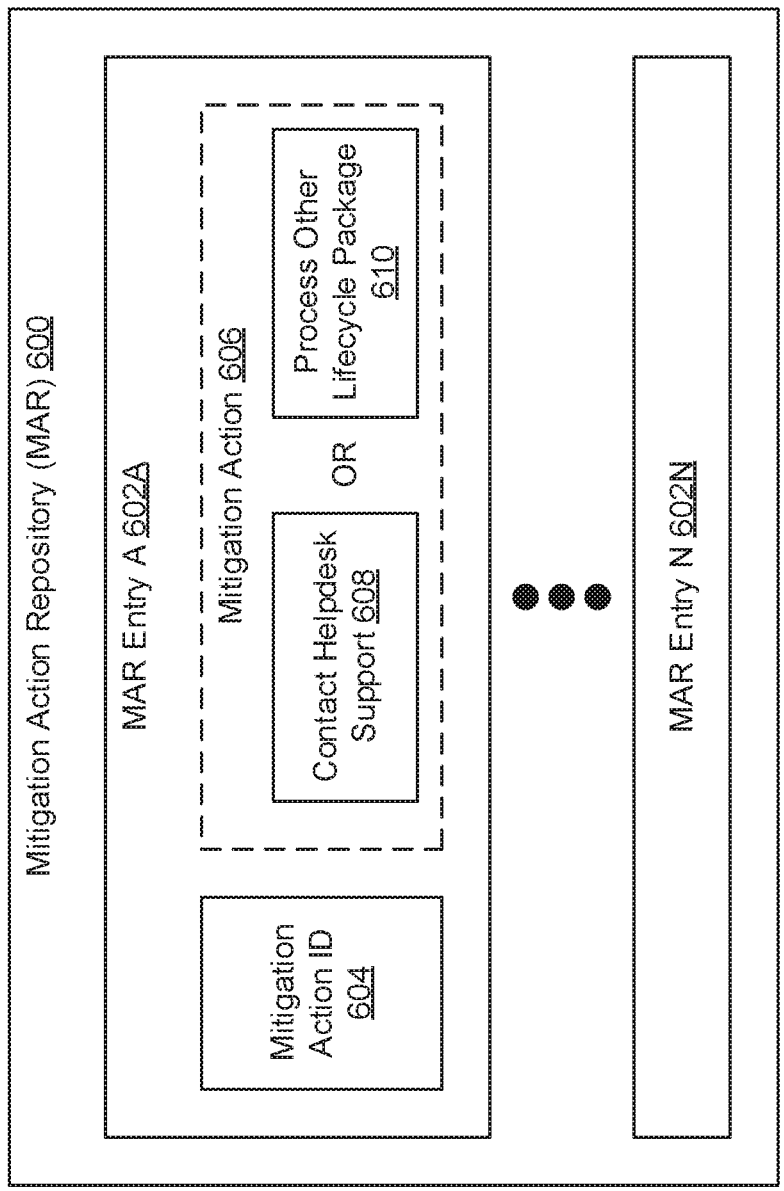
FIG. 6 shows a mitigation action repository in accordance with one or more embodiments of the invention.

FIG. 6 shows a mitigation action repository (MAR) in accordance with one or more embodiments of the invention. As described above, the MAR (600) may be a storage system or media for consolidating mitigation action information (MAI). MAI may pertain to instructions and/or data objects that implement any particular mitigation action. Further, the MAR (600) may be maintained, by a aggregator and distributor agent (ADA) executing on an environment lifecycle manager (ELM) (see e.g., FIG. 2), using information obtained from a package aggregator and distributor (PAD) (see e.g., FIG. 1). Moreover, the MAR (600) may consolidate MAI, respective to one or more mitigation actions depicted across one or more component state diagrams (CSDs) (see e.g., FIGS. 4A and 4B), as one or more MAR entries (602A-602N). Each MAR entry (602A-602N) may be a data container within which various related items of information reside. These related items of information may include a mitigation action ID (604) and instructions and/or data objects that implement a corresponding mitigation action (606). Each of these items of information is described below.

In one embodiment of the invention, the mitigation action ID (604) may refer to a string of characters (e.g., letters, numbers, symbols, etc.) that uniquely identify a mitigation action (MA) depicted across one or more depicted CSDs. Further, the MA ID (604) may entail any number and/or combination of characters. By way of an example, the MA ID (604) may be represented through an alphanumeric tag or a N-bit integer (where N>0) expressed in hexadecimal notation.

In one embodiment of the invention, the mitigation action (606) may refer to instructions and/or data objects that facilitate the transitioning of a component state (see e.g., FIGS. 4A and 4B) from one component state to another component state. That is, the mitigation action (606) may refer to instructions and/or data objects that facilitate the transitioning of a first condition or version of a component (installed on one or more hyper-converged infrastructure (HCI) nodes) to a second condition or version of the component. By way of an example, the mitigation action (606) may take form as intervention instructions directed to contacting helpdesk support (608). These intervention instructions may specify, at least, contact information or access to a ticketing system to reach developers (described above) of a component in order to receive assistance towards transitioning the component between component states. By way of another example, the mitigation action (606) may take form as a data object (e.g., a lifecycle package ID (see e.g., FIG. 5)) and processing instructions directed to applying another lifecycle package (610) associated with the data object. Moreover, though only two mitigation actions (606) are exemplified and describing above, one of ordinary skill will appreciate that the invention may be practiced using other mitigation actions, which may include, but are not limited to: instructions and/or data objects directed to opening a service request; instructions and/or data objects directed to a knowledge-base article; and instructions and/or data objects directed to retrying the pre-check.

Figure 7:
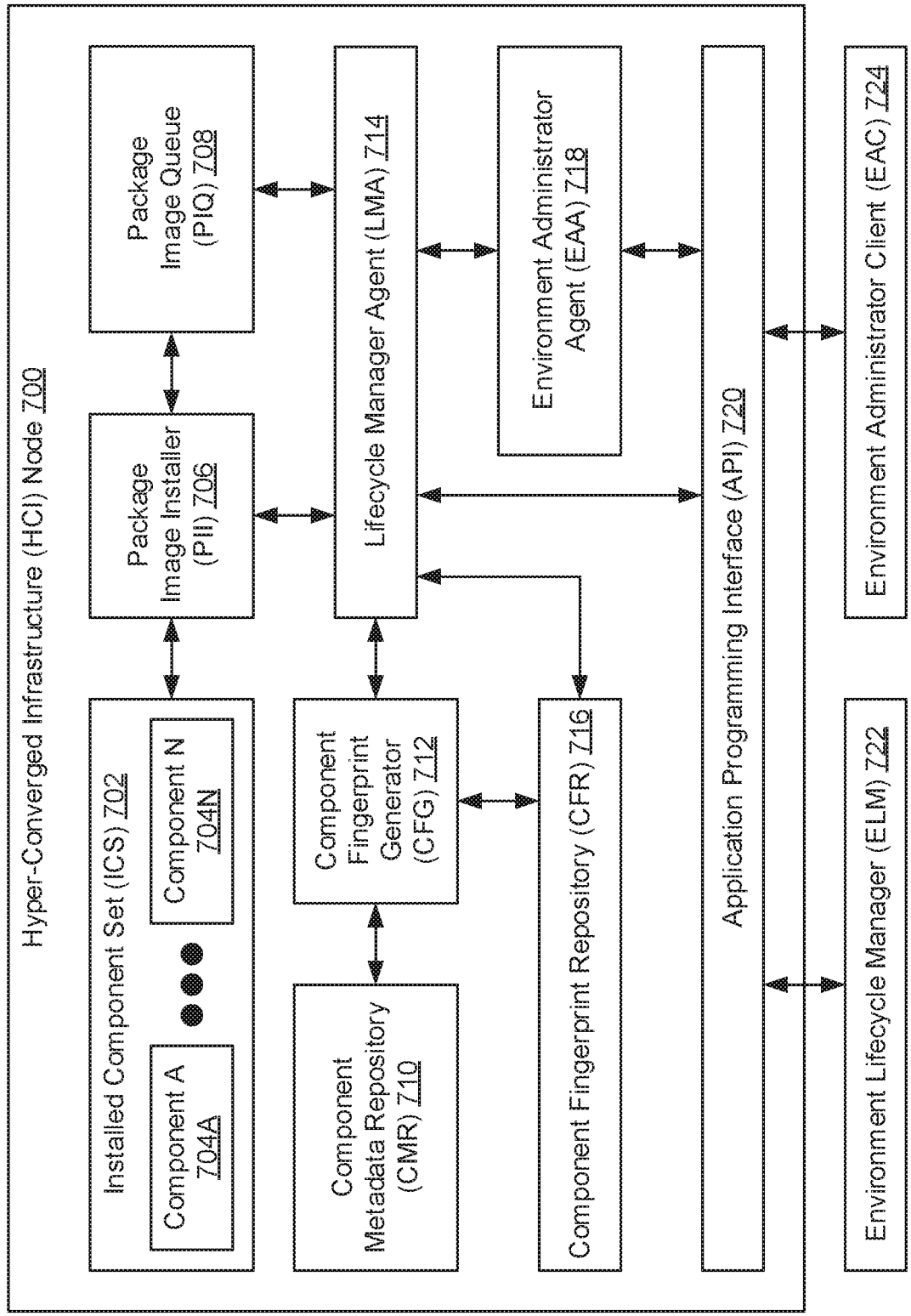
FIG. 7 shows a hyper-converged infrastructure node in accordance with one or more embodiments of the invention.

FIG. 7 shows a hyper-converged infrastructure (HCI) node in accordance with one or more embodiments of the invention. As described above, a HCI node (700) may refer to a physical appliance—e.g., a server (not shown) or any computing system similar to the exemplary computing system shown in FIG. 22. Further, a HCI node (700) may include an installed component set (ICS) (702), a package image installer (PII) (706), a package image queue (PIQ) (708), a component metadata repository (CMR) (710), a component fingerprint generator (CFG) (712), a lifecycle manager agent (LMA) (714), a component fingerprint repository (CFR) (716), an environment administrator agent (EAA) (718), and an application programming interface (API) (720). Each of these components is described below.

In one embodiment of the invention, the ICS (702) may refer to a set of one or more components (704A-704N) installed on the HCI node (700). Each component (704A-704N) may refer to an installed physical device (i.e., hardware) or an installed logical intelligence (i.e., software and/or firmware).

In one embodiment of the invention, HCI node (700) hardware components (704A-704N) may pertain to the various physical and/or tangible components of the HCI node (700). These various physical components may include functionality to provide the framework and resources on which HCI node (700) software and/or firmware components (704A-704N) operate. Examples of hardware components (704A-704N) include, but are not limited to, one or more: motherboards, central processing units (CPUs), graphics processing unit (GPU), random access memory (RAM), power supplies, video cards, storage devices (e.g., hard drives (HDDs), solid-state drives (SSDs), optical drives, etc.), audio cards, network interface cards (NICs), input peripherals (e.g., keyboards, microphones, joysticks, mice, etc.), and output peripherals (e.g., monitors, speakers, etc.).

In one embodiment of the invention, HCI node (700) software components (704A-704N) may pertain to computer instructions executing, and the information residing, on the HCI node (700). The computer instructions, or computer readable program code, may be executed by one or more HCI node (700) hardware components (704A-704N) (e.g., CPUs, GPUs, etc.) in order to instantiate and implement the functionalities of various computer programs and/or computer processes (i.e., instances of computer programs). Examples of these computer programs and/or processes include, but are not limited to: operating systems (OSs), user applications (e.g., work productivity applications, educational applications, entertainment applications, simulation applications, programming applications, etc.), and utilities (e.g., disk cleaners, file managers, system monitors, screen-savers, etc.). Further, the aforementioned information residing on the HCI node (700) may include any computer readable data that may be generated, read, and/or manipulated by any one or more of the computer programs and/or processes executing on the HCI node (700). Examples of information that may reside on the HCI node (700) include, but is not limited to: raw data, programming tool libraries, documentation, and digital media (e.g., audio and/or video clips, images, etc.).

In one embodiment of the invention, HCI node (700) firmware components (704A-704N) may pertain to special computer instructions and information embedded in one or more HCI node (700) hardware components (704A-704N) during their respective manufacturing processes. In contrast, HCI node (700) software components (704A-704N) may refer to computer instructions and information on the HCI node (700) that may be installed after these manufacturing processes. Specifically, the computer instructions representative of HCI node (700) firmware components (704A-704N) may be computer readable program code that implements the basic functionalities of HCI node (700) hardware components (704A-704N). Further, these computer instructions may serve as mediators or translators between one or more HCI node (700) hardware components (704A-704N) components and HCI node (700) software components (704A-704N) executing thereon. Examples of HCI node (700) firmware components (704A-704N) include, but are not limited to: device drivers, basic input/output systems (BIOSs), and virtual device drivers (i.e., used in the emulation of physical hardware).

In one embodiment of the invention, the PII (706) may be a computer program or process (i.e., an instance of a computer program) that executes on the underlying hardware of the HCI node (700). Specifically, the PII (706) may be a computer program or process tasked with the application or installation of obtained lifecycle package images (LPIs) (see e.g., FIG. 5) to upgrade, patch, and/or fix one or more components (704A-704N) to which the LPIs are directed. To that end, the PII (706) may include functionality to: access the PIQ (708) to obtain relevant component identifiers (IDs) (described above) and corresponding LPIs; identify components (704A-704N) associated with obtained relevant component IDs; and apply the obtained LPIs onto the identified components (704A-704N), thereby updating, patching, and/or fixing them.

In one embodiment of the invention, the PIQ (708) may be a data structure that resembles a first in, first out (FIFO) queue. That is, per the FIFO mechanism, elements (i.e., entries) exit the PIQ (708) in the order in which they entered the PIQ (708). Further, an element or entry may enqueue (i.e., enter) through a top, back, or tail of the PIQ (708) and, subsequently, dequeue (i.e., exit) through a bottom, front, or head of the PIQ (708). In one embodiment of the invention, the PIQ (708) may be a data structure that buffers one or more LPIs that may be awaiting installation or application onto their respective components (704A-704N) by the PII (706). The PIQ (708) is described in further detail below with respect to FIG. 8.

In one embodiment of the invention, the CMR (710) may be a storage system or media for consolidating component metadata (described below) pertaining to the various components (704A-704N) of the ICS (702). The CMR (710) may be implemented across one or more physical and/or virtual storage units or devices, which may or may not be of the same type. Furthermore, the information consolidated in the CMR (710) may be arranged using any storage mechanism (e.g., a filesystem, a database, a collection of tables, etc.). In one embodiment of the invention, the CMR (710) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). In one embodiment of the invention, the CMR (710) may be implemented using memristor technology. The CMR (710) is described in further detail below with respect to FIG. 9.

In one embodiment of the invention, the CFG (712) may be a computer program or process (i.e., an instance of a computer program) that executes on the underlying hardware of the HCI node (700). Specifically, the CFG (712) may be a computer program or process tasked with generating current component fingerprints (CCFs). A CCF may refer to a digital signature associated with a current state for any component (704A-704N) installed on the HCI node (700), and is described in further detail below with respect to FIG. 11. Substantively, the CFG (712) may include functionality to, in accordance with one or more embodiments of the invention: generate CCFs (see e.g., FIGS. 19A and 19B).

In one embodiment of the invention, the LMA (714) may be a computer program or process (i.e., an instance of a computer program) that executes on the underlying hardware of the HCI node (700). Specifically, the LMA (714) may be a computer program or process tasked with managing any and all interactions between the HCI node (700) and an environment lifecycle manager (ELM) (722) (see e.g., FIG. 2). To that end, the LMA (714) may include functionality to, in accordance with one or more embodiments of the invention: process available package notifications (APNs) (see e.g., FIGS. 18A and 18B) received from the ELM (722); and process request responses (see e.g., FIGS. 21A and 21B) also received from the ELM (722).

In one embodiment of the invention, the CFR (716) may be a storage system or media for consolidating CCFs (described above) pertaining to the various components (704A-704N) of the ICS (702). The CFR (716) may be implemented across one or more physical and/or virtual storage units or devices, which may or may not be of the same type. Furthermore, the information consolidated in the CFR (716) may be arranged using any storage mechanism (e.g., a filesystem, a database, a collection of tables, etc.). In one embodiment of the invention, the CFR (716) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). In one embodiment of the invention, the CFR (716) may be implemented using memristor technology. The CFR (716) is described in further detail below with respect to FIG. 10.

In one embodiment of the invention, the EAA (718) may be a computer program or process (i.e., an instance of a computer program) that executes on the underlying hardware of the HCI node (700). Specifically, the EAA (718) may be a computer program or process tasked with managing any and all interactions between the HCI node (700) and an environment administrator client (EAC) (724) (see e.g., FIG. 1). To that end, the EAA (718) may include functionality to obtain, process, and respond to API requests, delegated from the API (720), which pertain to interactions involving the EAC (724).

In one embodiment of the invention, the API (720) may be a hardware and/or software implemented construct that employs a set of subroutine definitions, protocols, and/or tools for enabling communications and/or information exchange between the HCI node (700) and other entities such as, for example, the ELM (722) and the EAC (724). The API (720) may include functionality to: receive API requests from these other entities; delegate API requests for processing to appropriate handlers (i.e., the LMA (714) or the EAA (718)); obtain, based on this processing, outcomes from these appropriate handlers; encode these outcomes to generate API responses; transmit these API responses to the other entities; obtain queries from the aforementioned appropriate handlers; encode these queries to generate other API requests; issue these other API requests to other entities; obtain other API responses, including queried information, to these other API requests from other entities; and directing the queried information to the appropriate handlers. One of ordinary skill will appreciate that the API (720) may perform other functionalities without departing from the scope of the invention. Further, by way of an example, the API (720) may be a web API that may be accessed through an assigned web address (e.g., a uniform resource locator (URL)) and a WAN (e.g., Internet) connection.

Figure 8:
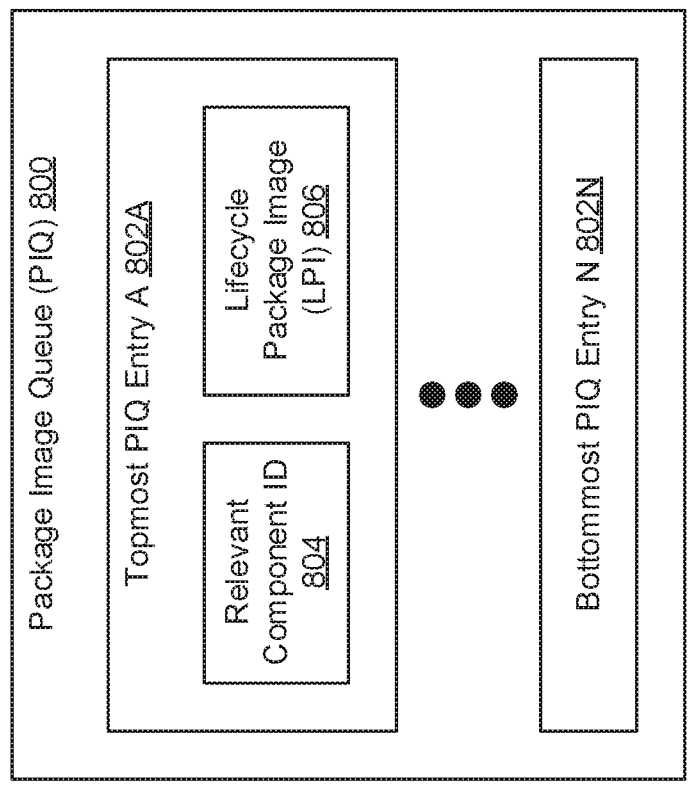
FIG. 8 shows a package image queue in accordance with one or more embodiments of the invention.

FIG. 8 shows a package image queue (PIQ) in accordance with one or more embodiments of the invention. As described above, the PIQ (800) may be a data structure that resembles a first in, first out (FIFO) queue. Subsequently, the PIQ (800) may be a data structure that buffers one or more lifecycle package images (LPIs) (806) that may be awaiting installation or application onto their respective components by a package image installer (PII) (see e.g., FIG. 7). Further, the PIQ (800) may be maintained, by a lifecycle manager agent (LMA) executing on any hyper-converged infrastructure (HCI) node, using information obtained from an environment lifecycle manager (ELM) (see e.g., FIG. 2). Moreover, the PIQ (800) may buffer LPIs (806), respective to one or more components installed on a HCI node, as one or more PIQ entries (802A-802N). Each PIQ entry (802A-802N) may be a data container within which various related items of information reside. These related items of information may include a relevant component ID (804) and a LPI (806). Each of these items of information is described below.

In one embodiment of the invention, the relevant component ID (806) may refer to a string of characters (e.g., letters, numbers, symbols, etc.) that uniquely identify a component to which the LPI (806) is directed. A component may refer to any physical device (i.e., hardware) or any logical intelligence (i.e., software and/or firmware) that may be installed on one or more HCI nodes. Further, the relevant component ID (806) may entail any number and/or combination of characters. By way of an example, the relevant component ID (806) may be represented through an alphanumeric tag or a N-bit integer (where N>0) expressed in hexadecimal notation.

In one embodiment of the invention, the LPI (806) may refer to any and all information necessary to implement the upgrade, patch, and/or fix to which the LPI (806) is directed. For example, the LPI (806) may encompass one or more binary files, representative of computer readable program code that may be interpreted and executed by a component, as well as lifecycle package metadata (entailing descriptive information pertaining to the lifecycle package with which the LPI (806) is associated). By way of examples, lifecycle package metadata may include, but is not limited to, a version number associated with the lifecycle package, a release data associated with the lifecycle package, a component name pertaining to a component to which the lifecycle package is directed, and a file size associated with the lifecycle package.

Figure 9:
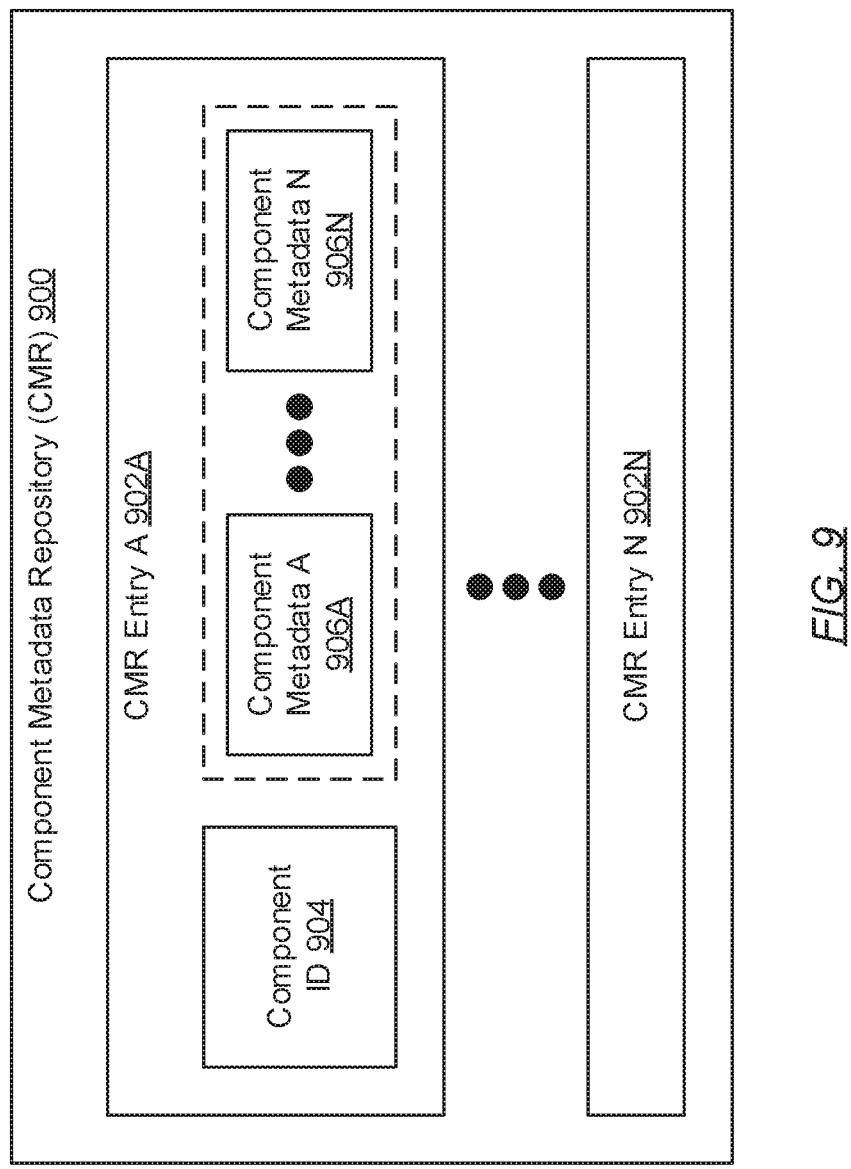
FIG. 9 shows a component metadata repository in accordance with one or more embodiments of the invention.

FIG. 9 shows a component metadata repository (CMR) in accordance with one or more embodiments of the invention. As described above, the CMR (900) may be a storage system or media for consolidating component metadata (906A-906N). Further, the CMR (900) may be maintained, by an operating system (OS) executing on any hyper-converged infrastructure (HCI) node, using information obtained from an environment lifecycle manager (ELM) (see e.g., FIG. 2). Moreover, the CMR (900) may consolidate component metadata (906A-906N), respective to one or more components installed on a HCI node, as one or more CMR entries (902A-902N). Each CMR entry (902A-902N) may be a data container within which various related items of information reside. These related items of information may include a component ID (904) and a set of one or more component metadata (906A-906N). Each of these items of information is described below.

In one embodiment of the invention, the component ID (904) may refer to a string of characters (e.g., letters, numbers, symbols, etc.) that uniquely identify a component installed on a HCI node. A component may refer to a physical device (i.e., hardware) or a logical intelligence (i.e., software and/or firmware) that may be installed on the HCI node. Further, the component ID (904) may entail any number and/or combination of characters. By way of an example, the component ID (904) may be represented through an alphanumeric tag or a N-bit integer (where N>0) expressed in hexadecimal notation.

In one embodiment of the invention, component metadata (906A-906N) may refer to descriptive information pertaining to the component (associated with the component ID (904)). By way of examples, component metadata (906A-906N) may include, but is not limited to, a version number associated with the component, a release data associated with the component, a component name pertaining to the component, a file size associated with the component, a parent component ID associated with a parent component of the component, one or more dependent component IDs associated with one or more dependent or child components of the component, and information detailing an installation order sequence for the component.

Figure 10:
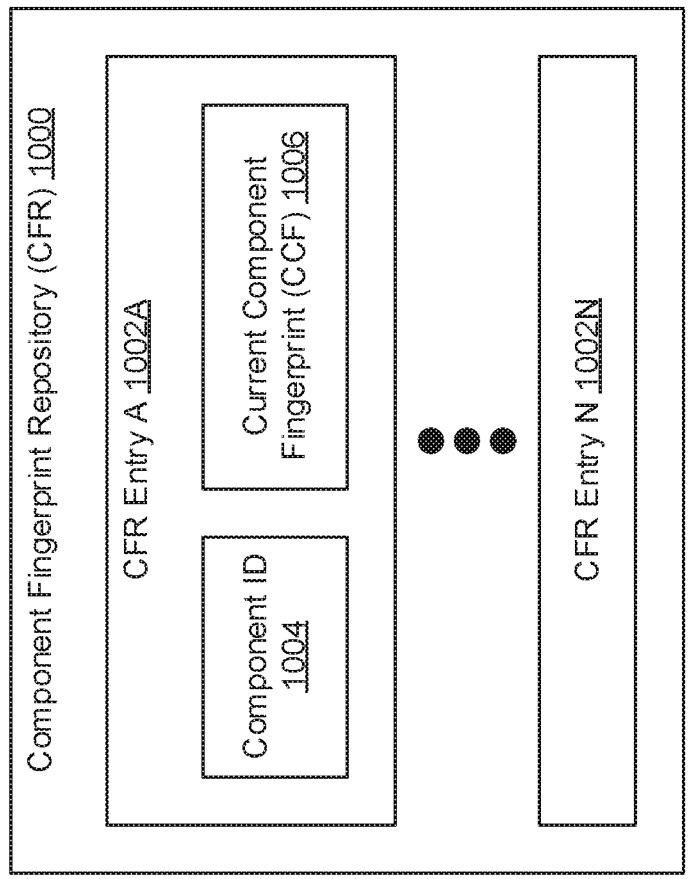
FIG. 10 shows a component fingerprint repository in accordance with one or more embodiments of the invention.

FIG. 10 shows a component fingerprint repository (CFR) in accordance with one or more embodiments of the invention. As described above, the CFR (1000) may be a storage system or media for consolidating current component fingerprints (CCFs) (1006) pertaining to one or more components installed on a hyper-converged infrastructure (HCI) node. Further, the CFR (1000) may be maintained, by a component fingerprint generator (CFG) (see e.g., FIG. 7) executing on any HCI node, using information obtained from a component metadata repository (CMR) (see e.g., FIG. 9). Moreover, the CFR (1000) may consolidate CCFs (1006), respective to one or more components installed on a HCI node, as one or more CFR entries (1002A-1002N). Each CFR entry (1002A-1002N) may be a data container within which various related items of information reside. These related items of information may include a component ID (1004) and a corresponding CCFs (1006). Each of these items of information is described below.

In one embodiment of the invention, the component ID (1004) may refer to a string of characters (e.g., letters, numbers, symbols, etc.) that uniquely identify a component installed on a HCI node. A component may refer to a physical device (i.e., hardware) or a logical intelligence (i.e., software and/or firmware) that may be installed on the HCI node. Further, the component ID (1004) may entail any number and/or combination of characters. By way of an example, the component ID (1004) may be represented through an alphanumeric tag or a N-bit integer (where N>0) expressed in hexadecimal notation.

In one embodiment of the invention, the CCF (1006) may refer to a digital signature associated with a current state for the component (associated with the component ID (1004)). Further, the CCF (1006) may be derived by submitting the aforementioned current state of the component, represented through various component metadata, through a hash function, which may employ any combination of existing and/or future developed cryptographic algorithms. As such, the CCF (1006) may be a hash value, a hash code, or a digest outputted by the hash function given the various component metadata, associated with the component, for input. CCFs (1006) are described in further detail below with respect to FIG. 11.

Figure 11:
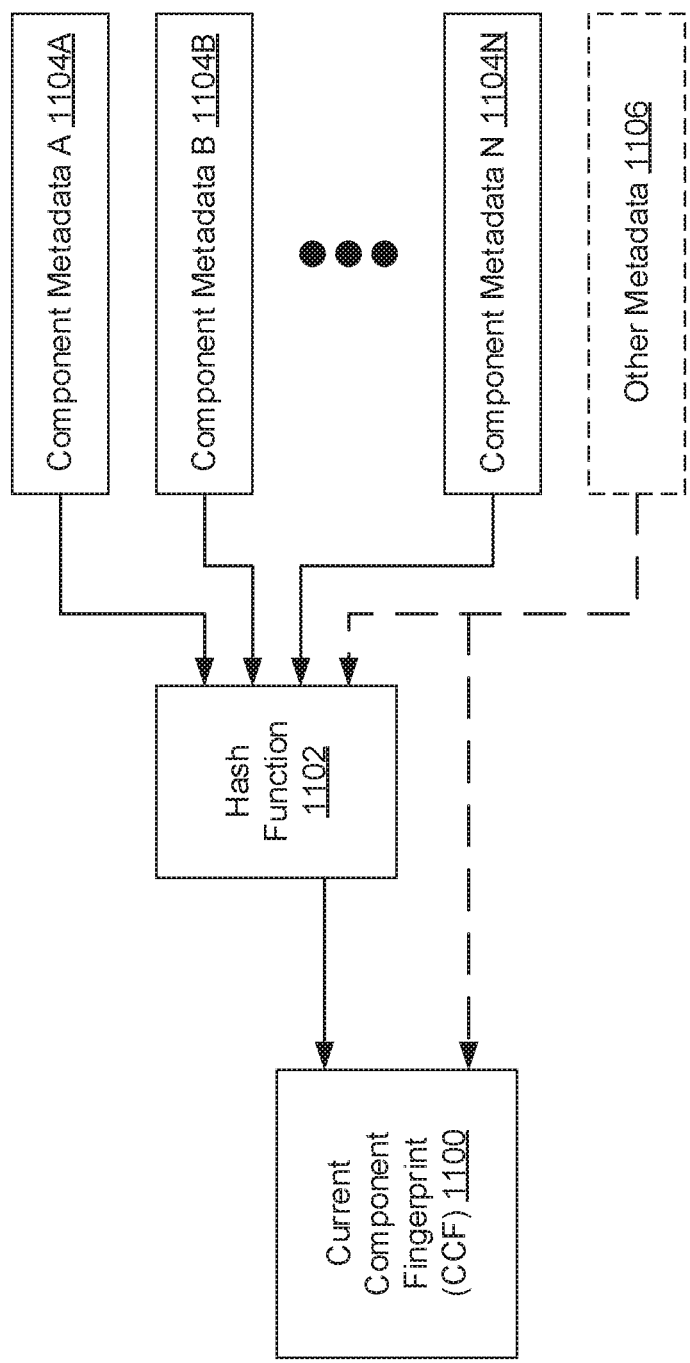
FIG. 11 shows a current component fingerprint in accordance with one or more embodiments of the invention.

FIG. 11 shows a current component fingerprint (CCF) in accordance with one or more embodiments of the invention. As described above, a CCF (1100) may be a digital signature, associated with a current state for a component, which may be derived from various component metadata (1104A-1104N). In another embodiment of the invention, the CCF (1100) may further be derived from other metadata (1106) that may or may not be pertinent to the component. Examples of other metadata (1106) include, but are not limited to, a parent component ID associated with a parent component of the component, one or more dependent component IDs associated with one or more dependent or child components of the component, and information detailing an installation order sequence for the component. Furthermore, towards deriving the CCF (1100), the various component metadata (1104A-1104N) and/or other metadata (1106) may be submitted through a hash function (1102), which may employ any combination of existing and/or future developed cryptographic algorithms. As such, in one embodiment of the invention, the CCF (1100) may, at least in part, refer to a hash value, a hash code, or a digest outputted by the hash function (1102) given the various metadata (i.e., component metadata (1104A-1104N) and/or other metadata (1106)) as input.

Figure 12A:
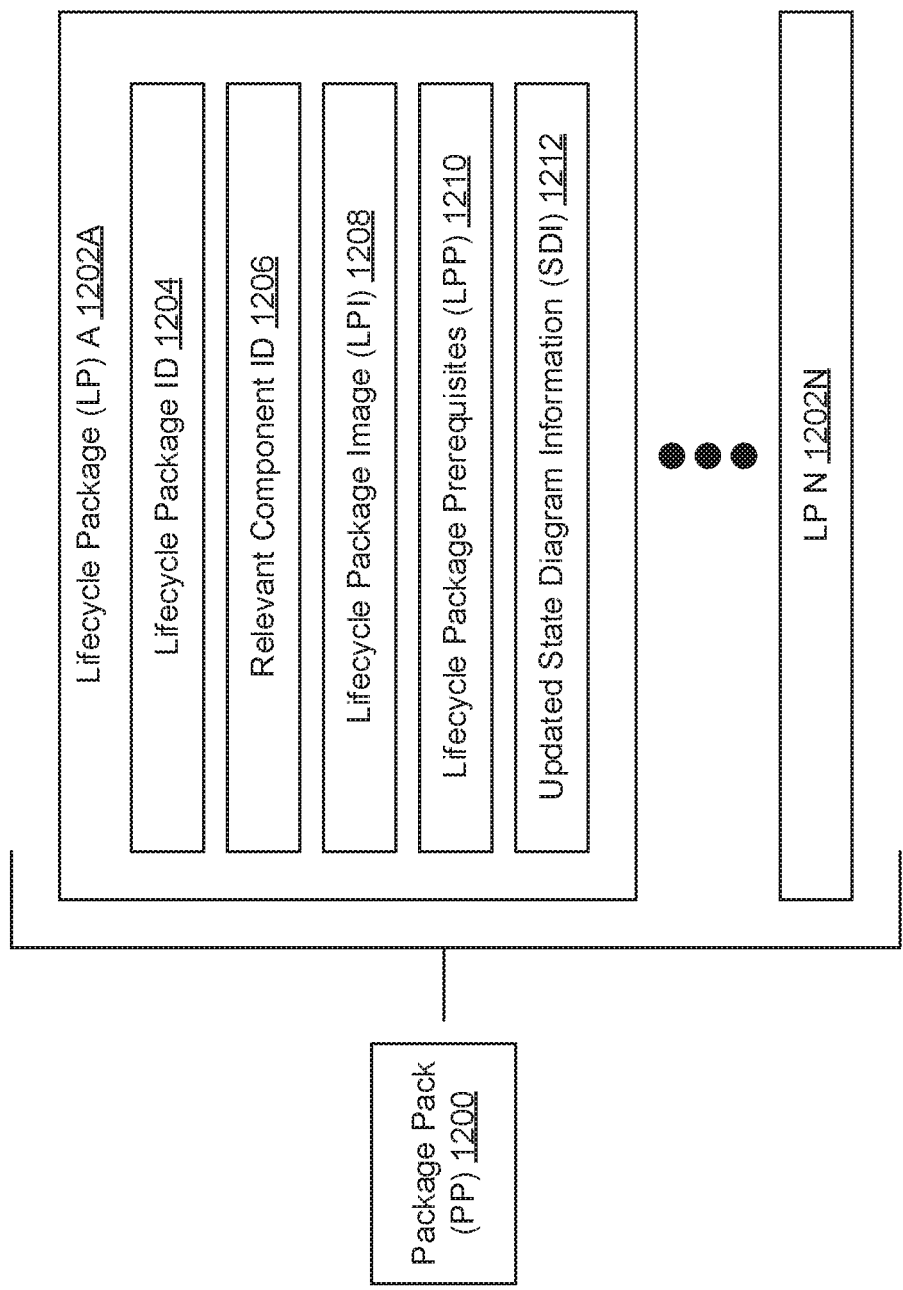
FIG. 12A shows a package pack in accordance with one or more embodiments of the invention.

FIG. 12A shows a package pack (PP) in accordance with one or more embodiments of the invention. The PP (1200) may refer to a message that pertains to the uploading of newly available lifecycle packages (LPs) (1202A-1202N). The PP (1200) may be assembled and issued by a package aggregator and distributor (PAD) (see e.g., FIG. 1) and, subsequently, received and processed by an environment lifecycle manager (ELM) (see e.g. FIG. 2). Furthermore, a LP (1202A-1202N) may refer to a data object or structure directed to any particular upgrade, patch, and/or fix for any component installed on one or more hyper-converged infrastructure (HCI) nodes. Each LP (1202A-1202N) may specify various related items of information. These related items of information may include a LP ID (1204), a relevant component ID (1206), a LP image (LPI) (1208), one or more lifecycle package prerequisites (LPPs) (1210), and updated state diagram information (SDI) (1212). Each of these items of information is described below.

In one embodiment of the invention, the LP ID (1204) may refer to a string of characters (e.g., letters, numbers, symbols, etc.) that uniquely identify a LP (1202A-1202N). Further, the LP ID (1204) may entail any number and/or combination of characters. By way of an example, the LP ID (1204) may be represented through an alphanumeric tag or a N-bit integer (where N>0) expressed in hexadecimal notation.

In one embodiment of the invention, the relevant component ID (1206) may refer to a string of characters (e.g., letters, numbers, symbols, etc.) that uniquely identify a component for which the LP (1202A-1202N) is directed. A component may refer to any physical device (i.e., hardware) or any logical intelligence (i.e., software and/or firmware) that may be installed on one or more HCI nodes. Further, the relevant component ID (1206) may entail any number and/or combination of characters. By way of an example, the relevant component ID (1206) may be represented through an alphanumeric tag or a N-bit integer (where N>0) expressed in hexadecimal notation.

In one embodiment of the invention, the LPI (1208) may refer to any and all information necessary to implement the upgrade, patch, and/or fix to which the LPI (1208) is directed. For example, the LPI (1208) may encompass one or more binary files, representative of computer readable program code that may be interpreted and executed by a component, as well as lifecycle package metadata (entailing descriptive information pertaining to the lifecycle package with which the LPI (1208) is associated). By way of examples, lifecycle package metadata may include, but is not limited to, a version number associated with the lifecycle package, a release data associated with the lifecycle package, a component name pertaining to a component to which the lifecycle package is directed, and a file size associated with the lifecycle package.

In one embodiment of the invention, a LPP (1210) may pertain to a required (or prerequisite) component state, of another component (i.e., a component other than the component associated with the relevant component ID (1206)), which must be met in order to release the LP (1202A-1202N) (associated with the lifecycle package ID (1204)) to a requesting HCI node. Further, a LPP (1210) may take form as a mapping associating a component (or prerequisite component) ID (not shown) (associated with the aforementioned other component—i.e., a prerequisite component) and a target component fingerprint (TCF) (not shown) directed to the aforementioned required (or requisite) component state of the other component. This mapping is described in further detail above with respect to FIG. 5.

In one embodiment of the invention, updated SDI (1212) may be a data object or structure that pertains to an updated component state diagram (CSD) (see e.g., FIGS. 4A and 4B) for the component associated with the relevant component ID (1206). Further, updated SDI (1212) may also pertain to associated CSD metadata directed to changes (i.e., new component state, new mitigation actions, new component fingerprint, etc.) depicted in and introduced by the updated CSD. The updated SDI (1212) is described in further detail below with respect to FIG. 12B.

Figure 12B:
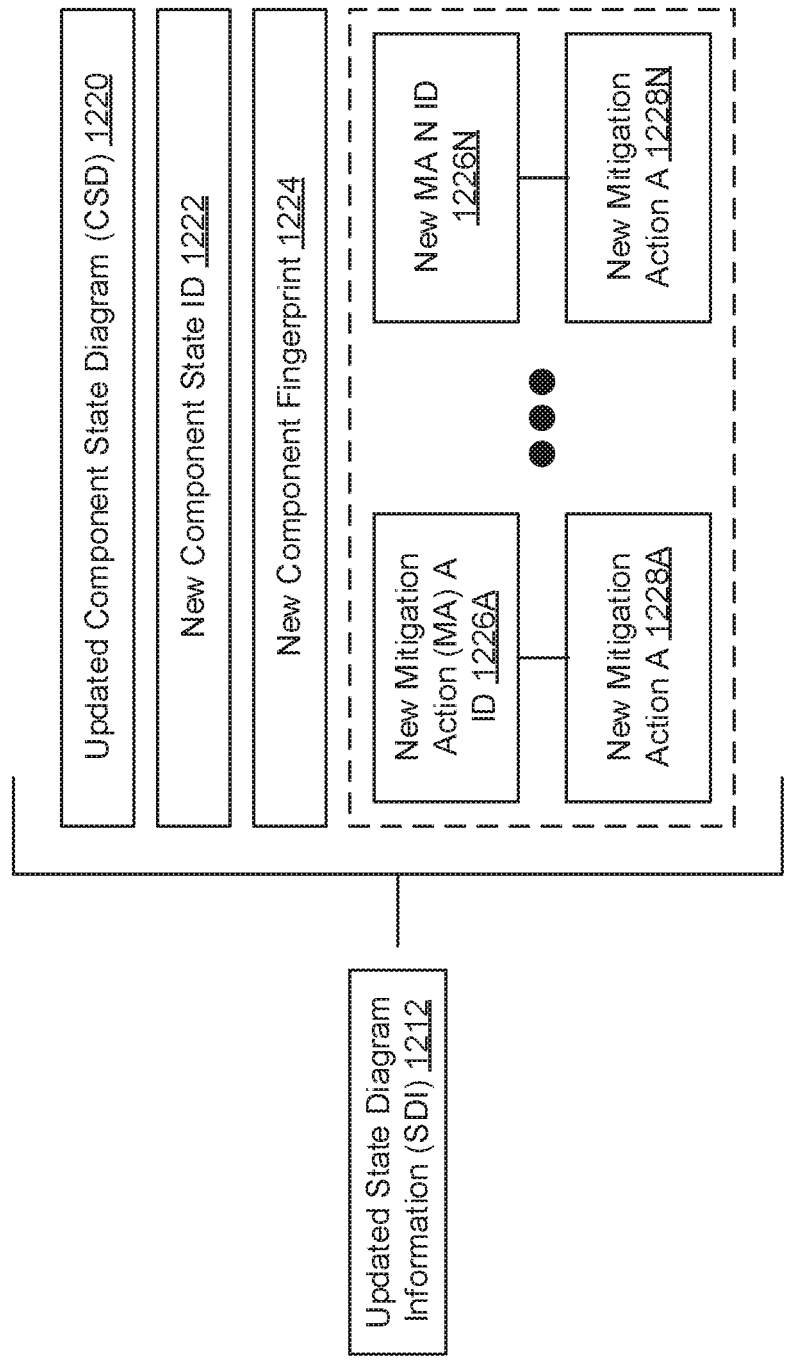
FIG. 12B shows updated state diagram information in accordance with one or more embodiments of the invention.

FIG. 12B shows updated state diagram information (SDI) in accordance with one or more embodiments of the invention. As described above, updated SDI (1212) may be a data object or structure that pertains to an updated component state diagram (CSD) (1220) (see e.g., FIGS. 4A and 4B) for a component installed on a hyper-converged infrastructure (HCI) node. Further, updated SDI (1212) may also pertain to associated CSD metadata directed to changes depicted in and introduced by the updated CSD. Moreover, updated SDI (1212) may specify various related items of information. These related items of information may include an updated CSD (1220), a new component state ID (1222), a new component fingerprint (1224), and new mitigation action information (MAI) (1226A/1228A-1226N/1228N). Each of these items of information is described below.

In one embodiment of the invention, the updated CSD (1220) may be an updated state transition graph pertaining to the component associated with the relevant component ID (1206) (see e.g. FIG. 12A). Specifically, the updated CSD (1220) may refer to an updated diagram of nodes (or vertices), representative of states, and directed edges, representative of mitigation actions, that connect these nodes, thereby collectively illustrating an updated lifecycle management (LCM) history of the component (associated with the relevant component ID (1206)). Furthermore, the updated CSD (1220) may depict a new node thereon, which may pertain to the new component state ID (1222) and the new component fingerprint (1224). Moreover, the updated CSD (1220) may further depict one or more new edges connecting the aforementioned new node to one or more existing nodes portrayed in a previous CSD (not shown) for the component. In one embodiment of the invention, the one or more new edges may direct to one or more new mitigation action (MA) IDs (1226A-1226N) and, subsequently, to one or more new MAs (1228A-122N). In another embodiment of the invention, at least a portion of the new edges may direct to existing MA IDs (not shown) and, subsequently, to existing MAs (not shown). An example CSD (1220) is portrayed and further described above with respect to FIG. 4B.

In one embodiment of the invention, the new component state ID (1222) may refer to a string of characters (e.g., letters, numbers, symbols, etc.) that uniquely identify a new component state, depicted in or introduced by the updated CSD (1220), of the component associated with the relevant component ID (1206). A component state may refer to a particular condition or version of the component. Further, the new component state ID (1222) may entail any number and/or combination of characters. By way of an example, the new component state ID (1222) may be represented through an alphanumeric tag or a N-bit integer (where N>0) expressed in hexadecimal notation.

In one embodiment of the invention, the new component fingerprint (1224) may refer to a digital signature derived from component metadata pertaining to the new component state associated with the new component state ID (1222). Specifically, the new component fingerprint (1224) may be derived by submitting the component metadata, representative of the new component state, through a hash function, which may employ any combination of existing and/or future developed cryptographic algorithms. As such, the new component fingerprint (1224) may be a hash value, a hash code, or a digest outputted by the hash function given the various component metadata, associated with the component associated with the relevant component ID (1206), for input.

In one embodiment of the invention, new MAI (1226A/ 1228A-1226N/1228N) may pertain to instructions and/or data objects that implement one or more new mitigation actions (MAs) depicted in or introduced by the updated CSD (1220). The new MAI may associate one or more new MA IDs (1226A-1226N) to one or more new MAs (1228A- 1228N), respectively. Each of these items of information is described below.

In one embodiment of the invention, a MA ID (1226A- 1226N) may refer to a string of characters (e.g., letters, numbers, symbols, etc.) that uniquely identify a new MA (1228A-1228N) depicted in or introduced by the updated CSD (1220). Further, the MA ID (1226A-1226N) may entail any number and/or combination of characters. By way of an example, the MA ID (1226A-1226N) may be represented through an alphanumeric tag or a N-bit integer (where N>0) expressed in hexadecimal notation.

In one embodiment of the invention, a new MA (1228A- 1228N) may refer to instructions and/or data objects that facilitate the transitioning of a component state (see e.g., FIGS. 4A and 4B) from an existing component state to the new component state (associated with the new component state ID (1222)), and/or from the new component state to an existing component state. By way of an example, the new MA (1228A-1228N) may take form as intervention instructions directed to contacting helpdesk support. These intervention instructions may specify, at least, contact information or access to a ticketing system to reach developers (described above) of a component in order to receive assistance towards transitioning the component between component states. By way of another example, the mitigation action (1228A-1228N) may take form as a data object (e.g., another lifecycle package ID (1204)) and processing instructions directed to applying another LP (1202A-1202N) associated with the data object. Moreover, though only two mitigation actions (1228A_1228N) are exemplified and describing above, one of ordinary skill will appreciate that the invention may be practiced using other mitigation actions, which may include, but are not limited to: instructions and/or data objects directed to opening a service request; instructions and/or data objects directed to a knowledge-base article; and instructions and/or data objects directed to retrying the pre-check.

Figure 13:
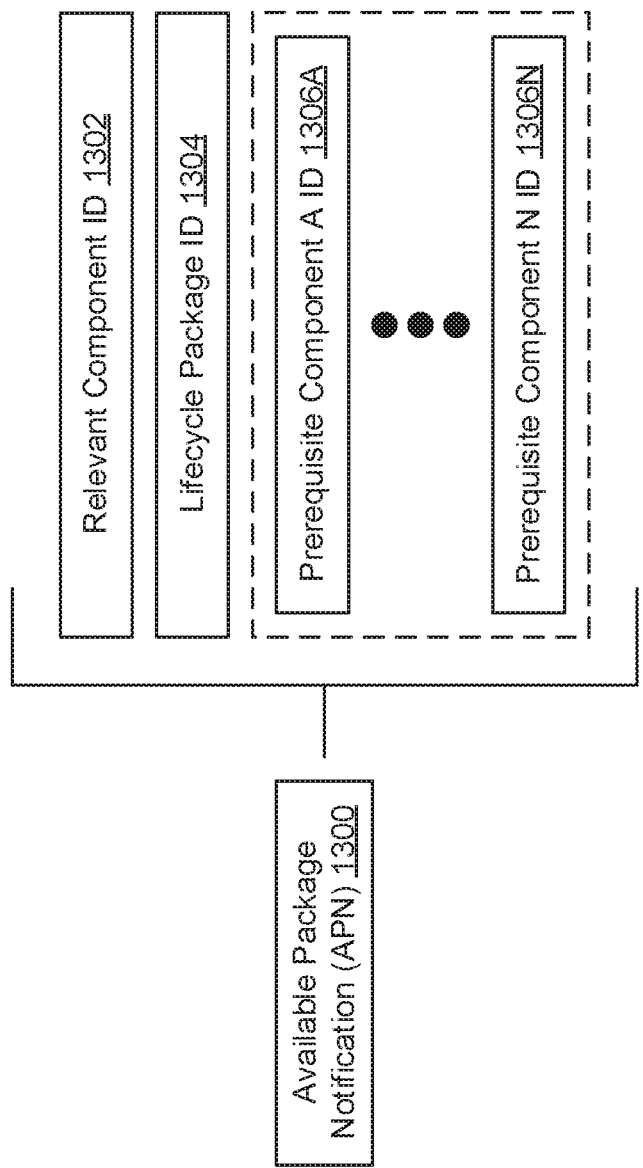
FIG. 13 shows an available package notification in accordance with one or more embodiments of the invention.

FIG. 13 shows an available package notification (APN) in accordance with one or more embodiments of the invention. The APN (1300) may refer to a message assembled and issued by an environment lifecycle manager (ELM) (see e.g., FIG. 2) and, subsequently, received and processed by one or more hyper-converged infrastructure (HCI) nodes (see e.g., FIG. 7). Further, the APN (1300) may pertain to notifying a HCI node of an available update, patch, and/or fix to a component installed on the HCI node. The APN (1300) may specify various related items of information. These related items of information may include a relevant component ID (1302), a lifecycle package ID (1304), and one or more prerequisite component IDs (1306A-1306N). Each of these items of information is described below.

In one embodiment of the invention, the relevant component ID (1302) may refer to a string of characters (e.g., letters, numbers, symbols, etc.) that uniquely identify a component for which the APN (1300) is directed. A component may refer to any physical device (i.e., hardware) or any logical intelligence (i.e., software and/or firmware) that may be installed on one or more HCI nodes. Further, the relevant component ID (1302) may entail any number and/or combination of characters. By way of an example, the relevant component ID (1302) may be represented through an alphanumeric tag or a N-bit integer (where N>0) expressed in hexadecimal notation.

In one embodiment of the invention, the lifecycle package ID (1304) may refer to a string of characters (e.g., letters, numbers, symbols, etc.) that uniquely identify a lifecycle package (i.e., update, patch, and/or fix) to which the APN (1300) is directed. Further, the lifecycle package ID (1304) may entail any number and/or combination of characters. By way of an example, the lifecycle package ID (1304) may be represented through an alphanumeric tag or a N-bit integer (where N>0) expressed in hexadecimal notation.

In one embodiment of the invention, a prerequisite component ID (1306A-1306N) may refer to a string of characters (e.g., letters, numbers, symbols, etc.) that uniquely identify a prerequisite component (i.e., a component other than the component associated with the relevant component ID (1302)). A prerequisite component may be a physical device (i.e., hardware) or a logical intelligence (i.e., software and/or firmware) that must be installed on a HCI node prior to, and in order for, the lifecycle package (associated with the lifecycle ID (1304)) to install without issues. Further, the prerequisite component ID (1304) may entail any number and/or combination of characters. By way of an example, the prerequisite component ID (1304) may be represented through an alphanumeric tag or a N-bit integer (where N>0) expressed in hexadecimal notation.

Figure 14:
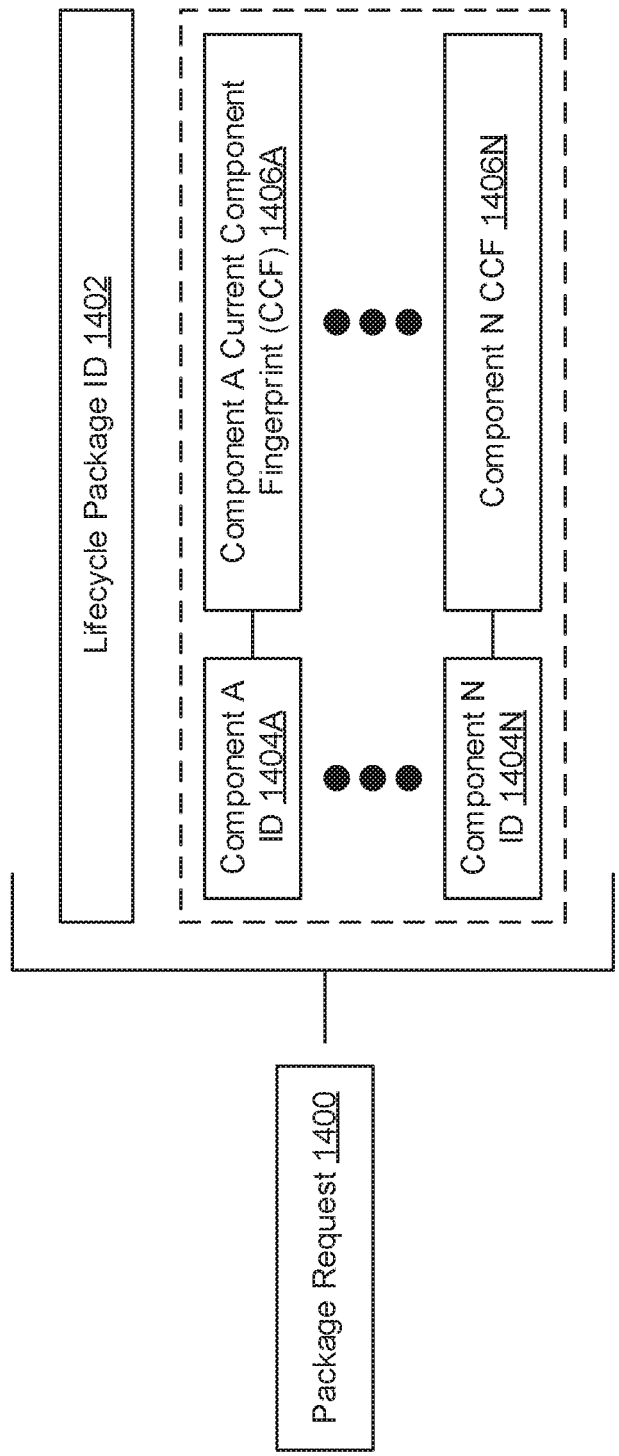
FIG. 14 shows a package request in accordance with one or more embodiments of the invention.

FIG. 14 shows a package request in accordance with one or more embodiments of the invention. The package request (1400) may refer to a message assembled and issued by a hyper-converged infrastructure (HCI) node (see e.g., FIG. 7) and, subsequently, received and processed by an environment lifecycle manager (ELM) (see e.g., FIG. 2). Further, the package request (1400) may pertain to requesting a lifecycle package (i.e., an update, patch, and/or fix) for download. The package request (1400) may specify various related items of information. These related items of information may include a lifecycle package ID (1402) and one or more component identifier (ID)-fingerprint mappings (1404A/1406A-1404N/1406N). Each of these items of information is described below.

In one embodiment of the invention, the lifecycle package ID (1402) may refer to a string of characters (e.g., letters, numbers, symbols, etc.) that uniquely identify a lifecycle package (i.e., update, patch, and/or fix) to which the package request (1400) is directed. Further, the lifecycle package ID (1402) may entail any number and/or combination of characters. By way of an example, the lifecycle package ID (1402) may be represented through an alphanumeric tag or a N-bit integer (where N>0) expressed in hexadecimal notation.

In one embodiment of the invention, a component ID-fingerprint mapping (1404A/1406A-1404N/1406N) may associate a component ID (1404A-1404N) to a corresponding current component fingerprint (CCF) (1406A-1406N)—each associated with a prerequisite component for the lifecycle package (associated with the lifecycle package ID (1402)). As described above, a prerequisite component may be a physical device (i.e., hardware) or a logical intelligence (i.e., software and/or firmware) that must be installed on a HCI node prior to, and in order for, the lifecycle package to install without issues. Returning to the component ID-fingerprint mapping (1404A/1406A-1404N/1406N), each of its constituent items of information is described below.

In one embodiment of the invention, the component ID (1404A-1404N) may refer to a string of characters (e.g., letters, numbers, symbols, etc.) that uniquely identify a component installed on a HCI node. In one embodiment of the invention, the component may be a prerequisite component (described above) for the lifecycle package (associated with the lifecycle package ID (1402)). Further, the component ID (1404A-1404N) may entail any number and/or combination of characters. By way of an example, the component ID (1404A-1404N) may be represented through an alphanumeric tag or a N-bit integer (where N>0) expressed in hexadecimal notation.

In one embodiment of the invention, the CCF (1406A-1406N) may refer to a digital signature associated with a current state for the component (i.e., prerequisite component) associated with the component ID (1404A-1404N). Further, the CCF (1406A-1406N) may be derived by submitting the aforementioned current state of the component, represented through various component metadata, through a hash function, which may employ any combination of existing and/or future developed cryptographic algorithms. As such, the CCF (1406A-1406N) may be a hash value, a hash code, or a digest outputted by the hash function given the various component metadata, associated with the component, for input. CCFs (1406A-1406N) are described in further detail above with respect to FIG. 11.

Figure 15:
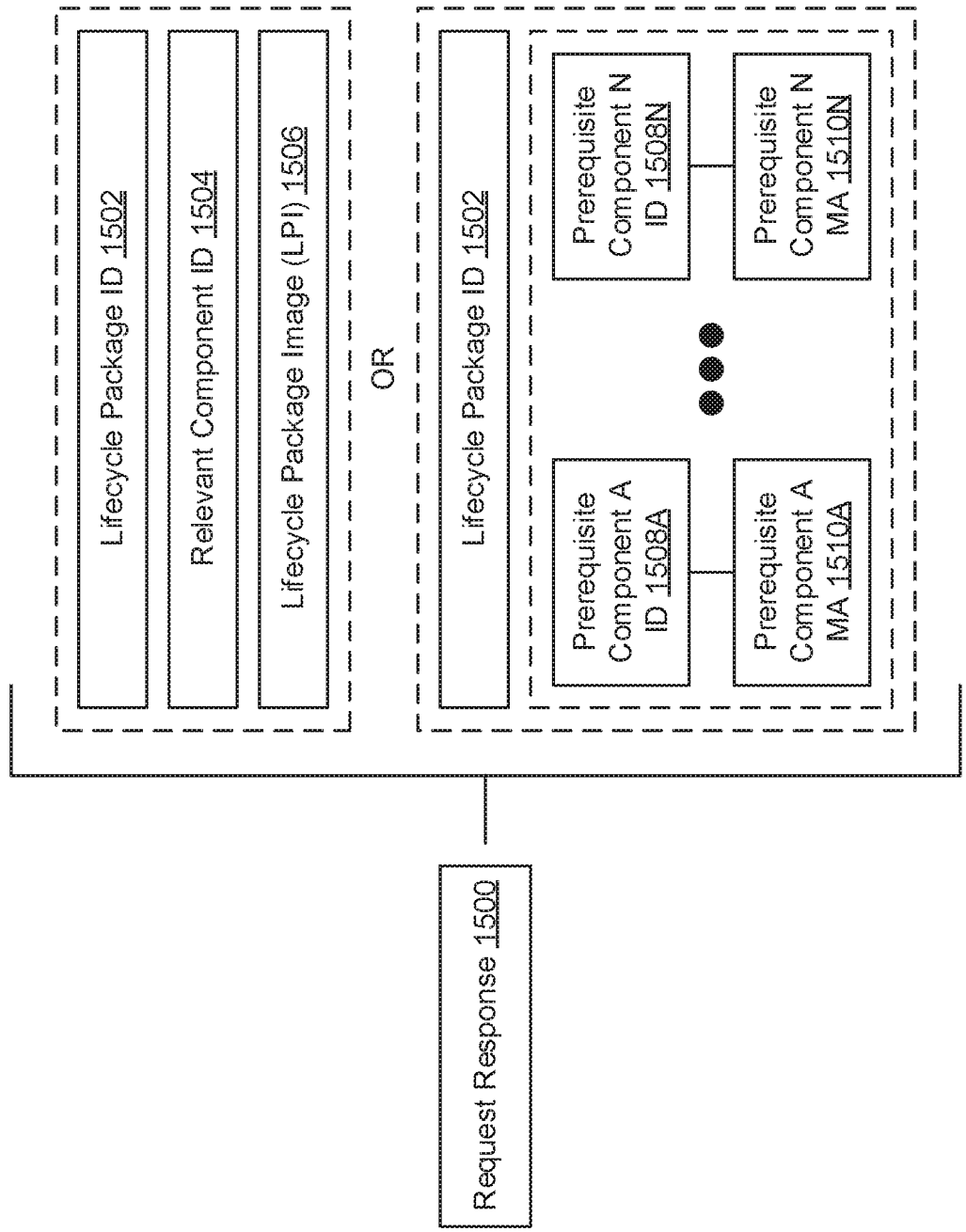
FIG. 15 shows a request response in accordance with one or more embodiments of the invention.

FIG. 15 shows a request response in accordance with one or more embodiments of the invention. The request response (1500) may refer to a message assembled and issued by an environment lifecycle manager (ELM) (see e.g., FIG. 2) and, subsequently, received and processed by one or more hyper-converged infrastructure (HCI) nodes (see e.g., FIG. 7). Further, the request response (1500) may pertain to a reply to the package request (see e.g., FIG. 14). Moreover, the request response (1500) may take on two different forms: (a) a first form directed to providing a requested update, patch, and/or fix, which may specify a lifecycle package ID (1502), a relevant component ID (1504), and a lifecycle package image (LPI) (1506); and (b) a second form directed to mitigating a failure to provide a requested update, patch, and/or fix, which may specify the lifecycle package ID (1502) and one or more prerequisite component ID-mitigation action (MA) mappings (1508A/1510A-1508N/1510N). Each of these items of information is described below.

In one embodiment of the invention, the lifecycle package ID (1502) may refer to a string of characters (e.g., letters, numbers, symbols, etc.) that uniquely identify a lifecycle package (i.e., update, patch, and/or fix) to which the first form of the request response (1500) is directed. Further, the lifecycle package ID (1502) may entail any number and/or combination of characters. By way of an example, the lifecycle package ID (1502) may be represented through an alphanumeric tag or a N-bit integer (where N>0) expressed in hexadecimal notation.

In one embodiment of the invention, the relevant component ID (1504) may refer to a string of characters (e.g., letters, numbers, symbols, etc.) that uniquely identify a component for which the lifecycle package (associated with the lifecycle package ID (1502)) is directed. A component may refer to any physical device (i.e., hardware) or any logical intelligence (i.e., software and/or firmware) that may be installed on one or more HCI nodes. Further, the relevant component ID (1504) may entail any number and/or combination of characters. By way of an example, the relevant component ID (1504) may be represented through an alphanumeric tag or a N-bit integer (where N>0) expressed in hexadecimal notation.

In one embodiment of the invention, the LPI (1506) may refer to any and all information necessary to implement the upgrade, patch, and/or fix to which the LPI (1506) is directed. For example, the LPI (1506) may encompass one or more binary files, representative of computer readable program code that may be interpreted and executed by a component, as well as lifecycle package metadata (entailing descriptive information pertaining to the lifecycle package with which the LPI (1506) is associated). By way of examples, lifecycle package metadata may include, but is not limited to, a version number associated with the lifecycle package, a release data associated with the lifecycle package, a component name pertaining to a component to which the lifecycle package is directed, and a file size associated with the lifecycle package.

In one embodiment of the invention, a prerequisite component ID-MA mapping (1508A/1510A-1508N/1510N) may associate a prerequisite component ID (1508A-1508N) to a corresponding prerequisite component MA (1510A-1510N)—each associated with a prerequisite component for the lifecycle package (associated with the lifecycle package ID (1502)). As described above, a prerequisite component may be a physical device (i.e., hardware) or a logical intelligence (i.e., software and/or firmware) that must be installed on a HCI node prior to, and in order for, the lifecycle package to install without issues. Returning to the prerequisite component ID-MA mapping (1508A/1510A-1508N/1510N), each of its constituent items of information is described below.

In one embodiment of the invention, a prerequisite component ID (1508A-1508N) may refer to a string of characters (e.g., letters, numbers, symbols, etc.) that uniquely identify a prerequisite component (described above). Further, the prerequisite component ID (1508A-1508N) may entail any number and/or combination of characters. By way of an example, the prerequisite component ID (1508A-1508N) may be represented through an alphanumeric tag or a N-bit integer (where N>0) expressed in hexadecimal notation.

In one embodiment of the invention, a prerequisite component MA (1510A-1510N) may refer to instructions and/or data objects that facilitate the transitioning of a prerequisite component state (see e.g., FIGS. 4A and 4B) from an existing (or current) component state (i.e., which may have been provided by a HCI node via a package request (see e.g., FIG. 14)) to a target component state (i.e., which may be required to install/apply the requested lifecycle package associated with the lifecycle package ID (1502)). By way of an example, the a prerequisite component MA (1510A-1510N) may take form as intervention instructions directed to contacting helpdesk support. These intervention instructions may specify, at least, contact information or access to a ticketing system to reach developers (described above) of a prerequisite component in order to receive assistance towards transitioning the prerequisite component between component states. By way of another example, a prerequisite component MA (1510A-1510N) may take form as a data object (e.g., another lifecycle package ID (not shown)) and processing instructions directed to applying another lifecycle package (not shown) associated with the data object.

Figure 16A:
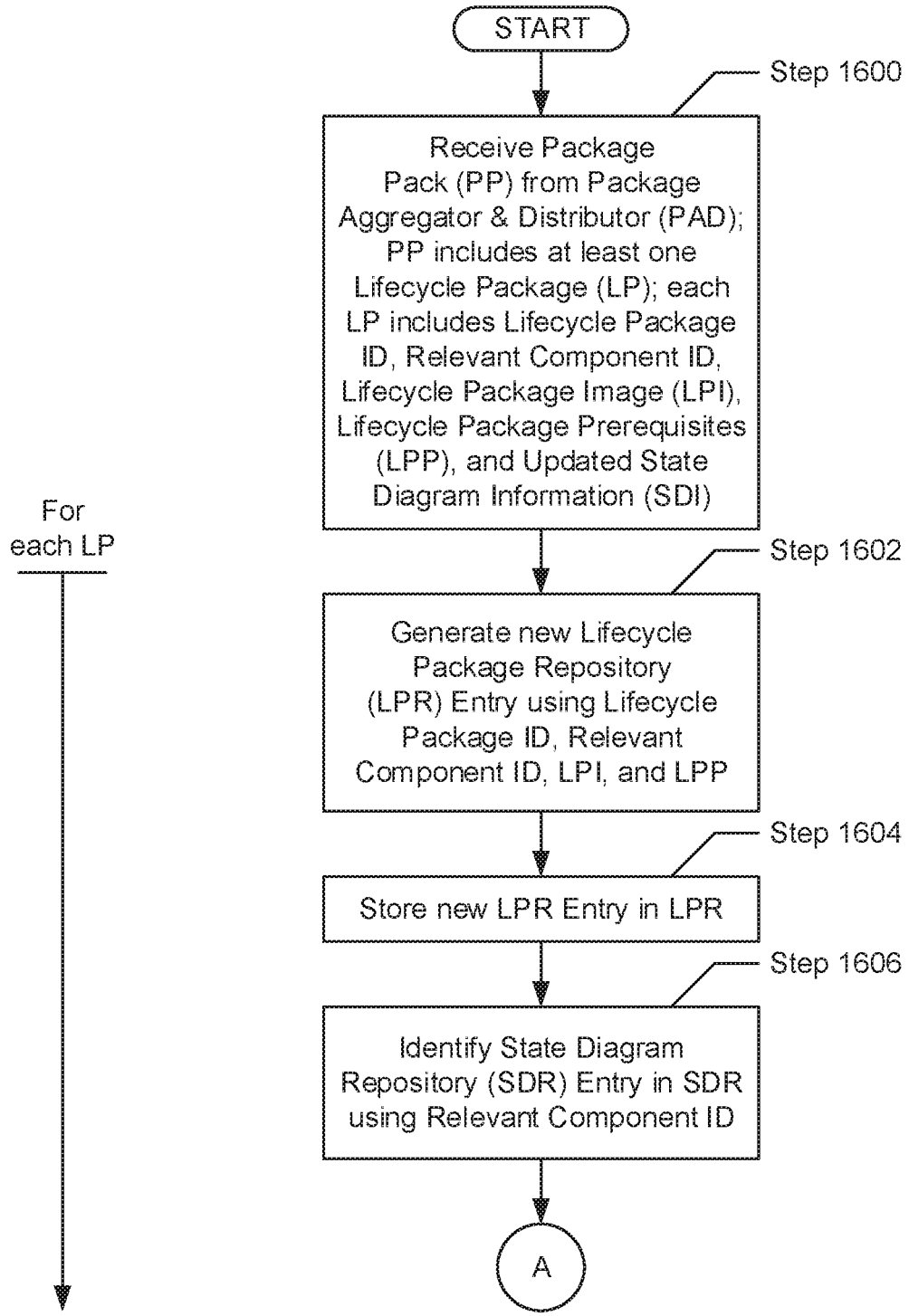
FIGS. 16A and 16B show flowcharts describing a method for processing package packs in accordance in accordance with one or more embodiments of the invention.
Figure 16B:
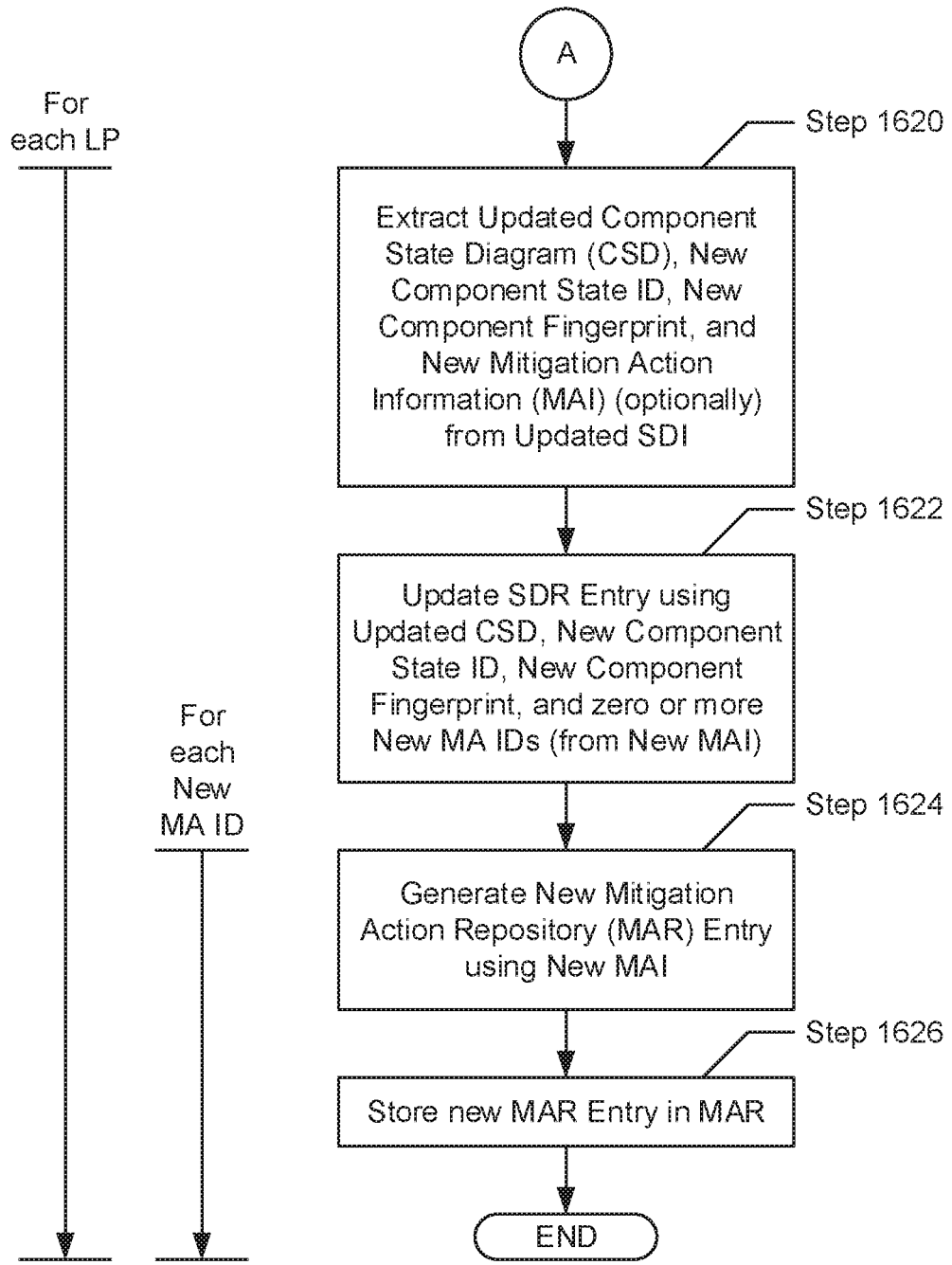

FIGS. 16A and 16B show flowcharts describing a method for processing package packs in accordance in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 16A, in Step 1600, a package pack (PP) is received from a package aggregator and distributor (PAD) (see e.g., FIG. 1). In one embodiment of the invention, the PP may refer to a message that pertains to the uploading of newly available lifecycle packages (LPs). Accordingly, the PP may include at least one LP. A LP may refer to a data object or structure directed to any particular upgrade, patch, and/or fix for a component installed on one or more hyper-converged infrastructure (HCI) nodes. Furthermore, each LP may specify a LP ID, a relevant component ID, a LP image (LPI), one or more LP prerequisites (LPPs), and updated state diagram information (SDI). The PP is described in further detail above with respect to FIG. 12A.

In Step 1602, for each LP included in the PP (received in Step 1600), a new LP repository (LPR) entry is generated. In one embodiment of the invention, the new LPR entry may be generated using the LP ID, the relevant component ID, the LPI, and the one or more LPPs. The LPR and respective LPR entries are described in further detail above with respect to FIG. 5. Subsequently, in Step 1604, the new LPR entry (generated in Step 1602) is stored in the LPR.

In Step 1606, a state diagram repository (SDR) entry in a SDR is identified. Specifically, in one embodiment of the invention, a SDR entry in the SDR is identified using the relevant component ID (obtained in Step 1600). That is, a search may be performed on the SDR to find an existing SDR entry therein that pertains or corresponds to the relevant component ID. The SDR and respective SDR entries are described in further detail above with respect to FIG. 4A.

Turning to FIG. 16B, in Step 1620, items of information specified in the updated SDI (obtained in Step 1600) are extracted therefrom. In one embodiment of the invention, the extract items of information include an updated component state diagram (CSD), a new component state ID, a new component fingerprint, and new mitigation action information (MAI) (if specified). The updated SDI and these respective items of information are described in further detail above with respect to FIG. 12B.

In Step 1622, the SDR entry (identified in Step 1606) is updated using at least a portion of the items of information (extracted from the updated SDI in Step 1620). Specifically, in one embodiment of the invention, updating the aforementioned SDR entry may entail: replacing the existing CSD therein with the extracted updated CSD; appending a new component state-fingerprint mapping, associating the extracted new component state ID to the extracted new component fingerprint, to the existing set of one or more component state-fingerprint mappings therein; and appending (if specified) any extracted new mitigation action (MA) IDs (specified in the extracted new MAI), to the existing set of one or more MA IDs therein.

In Step 1624, a new MA repository (MAR) entry is generated. In one embodiment of the invention, the new MAR entry may be generated using the extracted new MAI (if specified). Further, the new MAI may include one or more MA IDs and one or more corresponding MAs. The MAR and respective MAR entries are described in further detail above with respect to FIG. 6. Thereafter, in Step 1626, the new MAR entry (if generated in Step 1624) is stored in the MAR.

Figure 17:
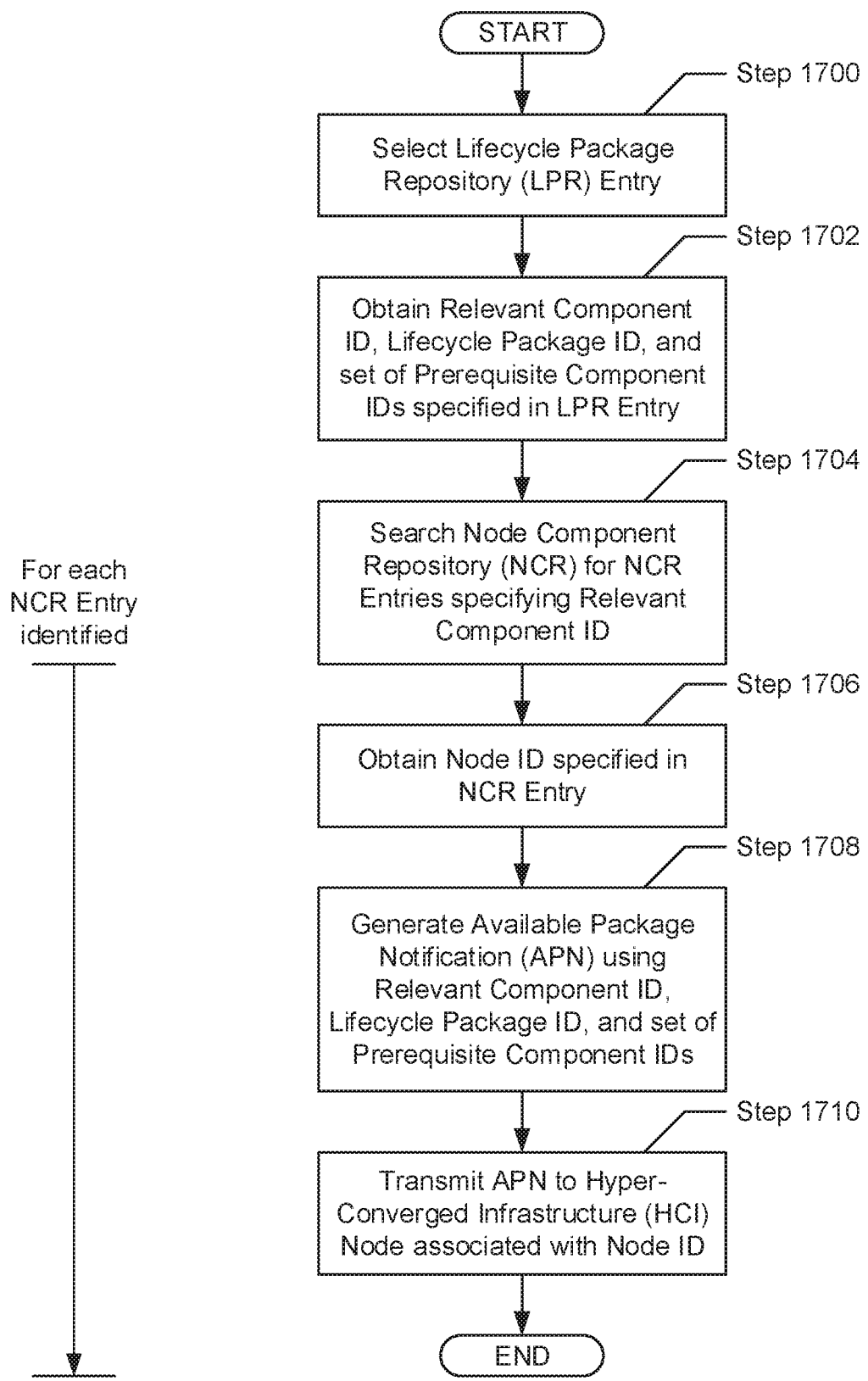
FIG. 17 shows a flowchart describing a method for issuing available package notifications in accordance with one or more embodiments of the invention.

FIG. 17 shows a flowchart describing a method for issuing available package notifications in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 17, in Step 1700, a lifecycle package repository (LPR) entry is selected. In one embodiment of the invention, the LPR may be a storage system or media for consolidating lifecycle package information (described above). Subsequently, each LPR entry may pertain to consolidating lifecycle package information for an available lifecycle package (e.g., directed to a component upgrade, patch, and/or fix). Further, selection of the LPR entry may be arbitrary or based on deployment timestamp indicative of a date/time the respective LP had been deployed.

In Step 1702, items of information specified in the LPR entry (selected in Step 1700) are extracted therefrom. In one embodiment of the invention, the extracted items of information include a relevant component ID, a lifecycle component ID, and one or more prerequisite component IDs. The LPR and these respective items of information are described in further detail above with respect to FIG. 5.

In Step 1704, a lookup is performed on a node component repository (NCR) using the relevant component ID (obtained in Step 1702). Specifically, in one embodiment of the invention, a search may be performed throughout the NCR for one or more NCR entries that each specify the relevant component ID therein. The NCR and respective NCR entries are described in further detail above with respect to FIG. 3.

In Step 1706, for each NCR entry (identified via the lookup performed in Step 1704), a node ID, also specified in the NCR entry, is obtained. Thereafter, in Step 1708, an available package notification (APN) is generated. In one embodiment of the invention, the APN may refer to a message that pertains to notifying a HCI node of an available update, patch, and/or fix to a component installed on the HCI node. Further, the APN may be generated using the relevant component ID, the lifecycle package ID, and the one or more prerequisite component IDs (extracted, in Step 1702, from the LPR entry selected in Step 1700). The APN is described in further detail above with respect to FIG. 13. In Step 1710, the APN (generated in Step 1708) is subsequently transmitted to a HCI node to which the node ID (obtained in Step 1706) pertains.

Figure 18A:
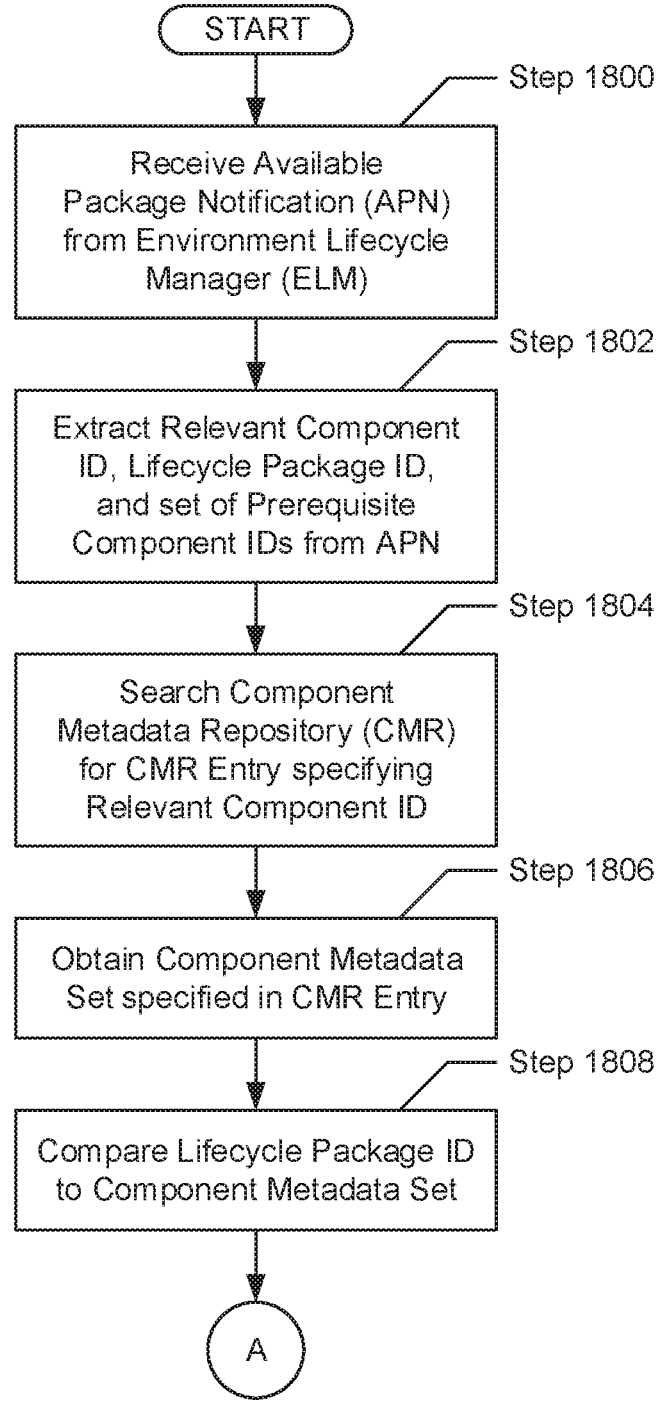
FIGS. 18A and 18B show flowcharts describing a method for processing available package notifications in accordance with one or more embodiments of the invention.
Figure 18B:
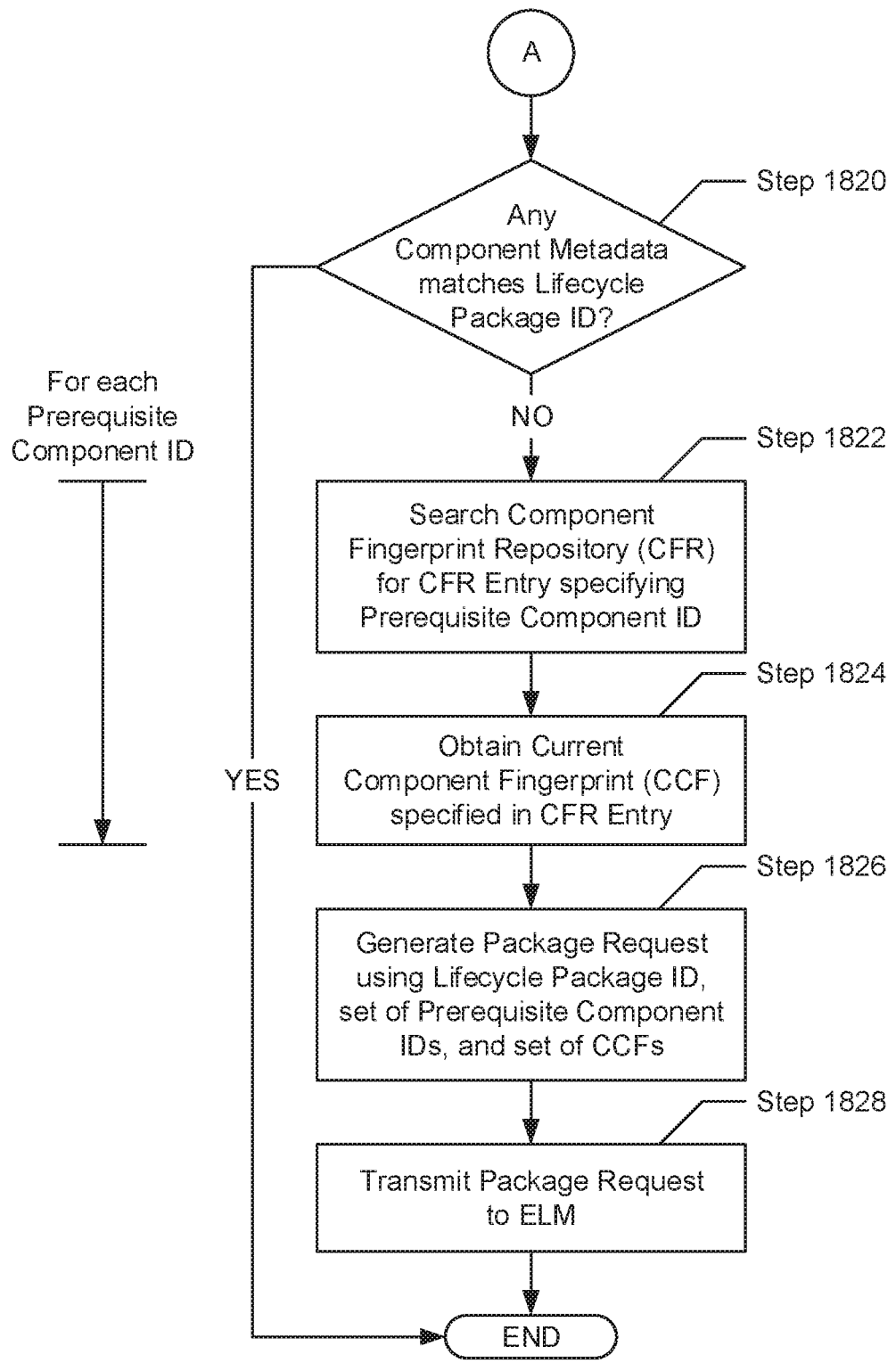

FIGS. 18A and 18B show flowcharts describing a method for processing available package notifications in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to Step 1800, an available package notification (APN) is received from an environment lifecycle manager (ELM) (see e.g., FIG. 2). In one embodiment of the invention, the APN may refer to a message that pertains to notifying a HCI node of an available update, patch, and/or fix to a component installed on the HCI node. In Step 1802, items of information specified in the APN (received in Step 1800) are extracted therefrom. In one embodiment of the invention, these extracted items of information include a relevant component ID, a lifecycle package ID, and one or more prerequisite component IDs. The APN and these respective items of information are described in further detail above with respect to FIG. 13.

In Step 1804, a lookup is performed on a component metadata repository (CMR) using the relevant component ID (extracted in Step 1802). Specifically, in one embodiment of the invention, a search may be performed throughout the CMR for one CMR entry that specifies the relevant component ID therein. The CMR and respective CMR entries are described in further detail above with respect to FIG. 9.

In Step 1806, a component metadata set, also specified in the CMR entry (identified via the lookup performed in Step 1804), is obtained. In one embodiment of the invention, the component metadata set may include one or more items of metadata pertinent to the component associated with the relevant component ID. One of the items of metadata may reference a lifecycle package ID directed to a current update, patch, and/or fix that has most recently been applied to the component. In Step 1808, the lifecycle package ID (extracted in Step 1802) is subsequently compared against the component metadata set (obtained in Step 1806).

Turning to FIG. 18B, in Step 1820, a determination is made as to whether any items of metadata, specified in the component metadata set (obtained in Step 1806), matches the lifecycle package ID (extracted in Step 1802). As mentioned above, one of the aforementioned items of metadata may reference a lifecycle package ID directed to a current update, patch, and/or fix that has most recently been applied to the component (with which the component metadata set is associated). Accordingly, the lifecycle package ID (extracted in Step 1802) may be compared against the lifecycle package ID specified in the component metadata set. If it is determined that the lifecycle package ID (extracted in Step 1802) matches the lifecycle package ID specified in the component metadata set, then the process may end because the lifecycle package, advertised through the APN (received in Step 1800), has already been installed on/applied to the component. On the other hand, if it is alternatively determined that the lifecycle package ID (extracted in Step 1802) mismatches the lifecycle package ID specified in the component metadata set, then the process may proceed to Step 1822.

In Step 1822, after determining (in Step 1820) that the lifecycle package ID (extracted in Step 1802) mismatches the lifecycle package ID specified in the component metadata set (obtained in Step 1806), a lookup on a component fingerprint repository (CFR) is performed using each prerequisite component ID (extracted in Step 1802). Specifically, in one embodiment of the invention, for each prerequisite component ID, a search may be performed throughout the CFR for one CFR entry that specifies the respective prerequisite component ID therein. The CFR and respective CFR entries are described in further detail above with respect to FIG. 10.

In Step 1824, a respective current component fingerprint (CCF), also specified in each CFR entry (identified via the lookup performed in Step 1822), is obtained. In one embodiment of the invention, a CCF may refer to a digital signature associated with a current state for the prerequisite component associated with a prerequisite component ID (extracted in Step 1802).

In Step 1826, a package request is generated. In one embodiment of the invention, the package request may refer to a message that pertains to requesting a lifecycle package (i.e., an update, patch, and/or fix) for download. Further, the package request may be generated using the lifecycle package ID and the one or more prerequisite component IDs (extracted in Step 1802), as well as the one or more CCFs (obtained in Step 1824), respective to each prerequisite component associated with the one or more prerequisite component IDs. The package request is described in further detail above with respect to FIG. 14. Thereafter, in Step 1828, the package request (generated in Step 1826) is transmitted to the ELM.

Figure 19A:
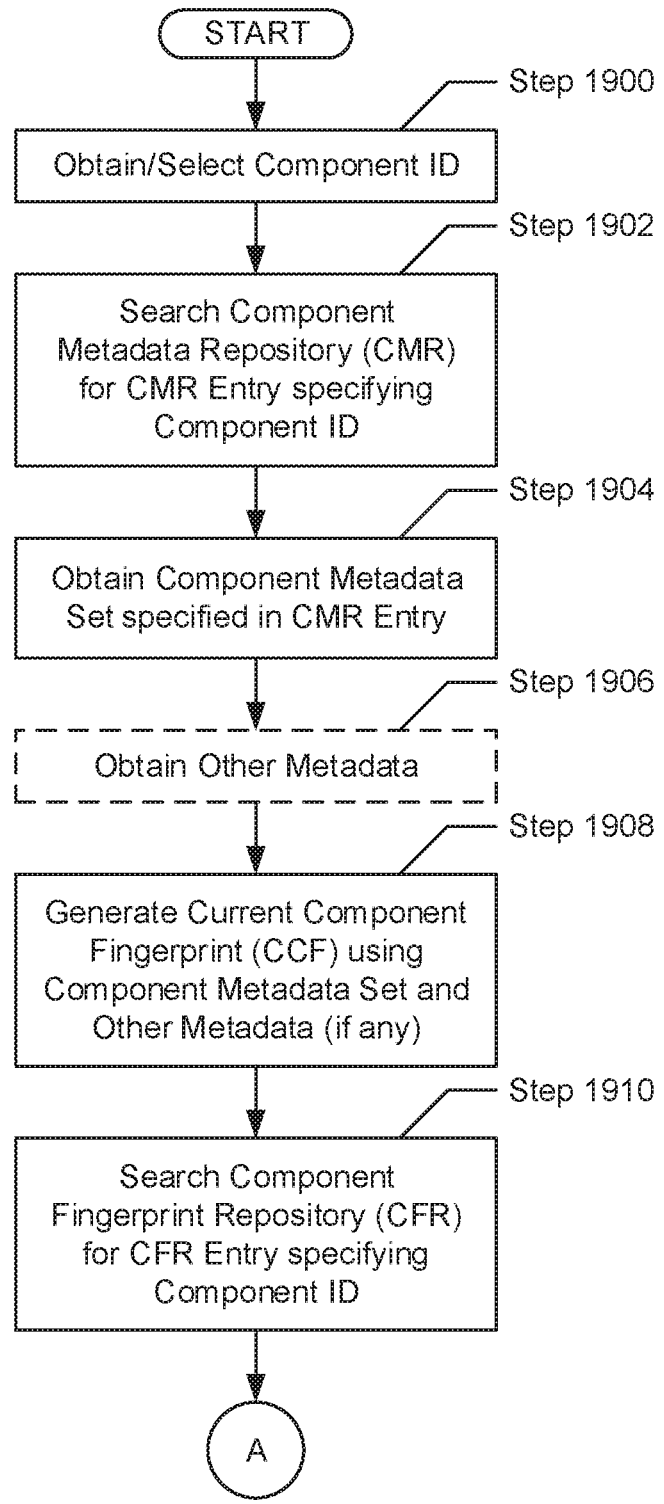
FIGS. 19A and 19B show flowcharts describing a method for generating current component fingerprints in accordance with one or more embodiments of the invention.
Figure 19B:
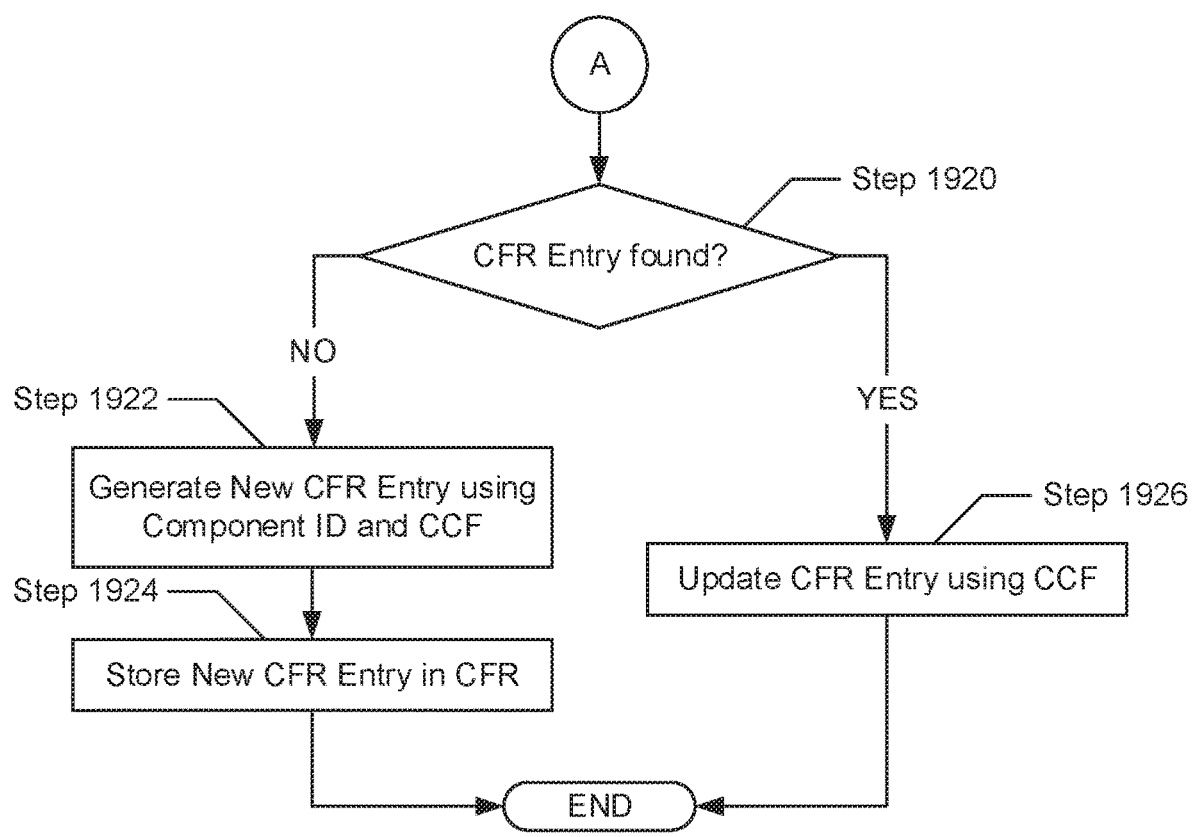

FIGS. 19A and 19B show flowcharts describing a method for generating current component fingerprints in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

In one embodiment of the invention, a current component fingerprint (CCF) may be generated upon receipt and application of a lifecycle package onto a respective component. That is, due to the application of the lifecycle package, a current state of the component changes and, subsequently, a new CCF must be generated and consolidated to reflect upon the change in current state of the component.

Turning to FIG. 19A, in Step 1900, a component ID is selected or obtained. In one embodiment of the invention, selection/obtaining of the component ID may be arbitrary. In another embodiment of the invention, as mentioned above, selection/obtaining of the component ID may result based on a change in current state of the component (associated with the component ID) due to the recent application of a lifecycle package thereon.

In Step 1902, a lookup is performed on a component metadata repository (CMR) using the component ID (selected/obtained in Step 1900). Specifically, in one embodiment of the invention, a search may be performed throughout the CMR for one CMR entry that specifies the component ID therein. The CMR and respective CMR entries are described in further detail above with respect to FIG. 9.

In Step 1904, a component metadata set, also specified in the CMR entry (identified via the lookup performed in Step 1902), is obtained. In one embodiment of the invention, the component metadata set may include one or more items of metadata pertinent to the component associated with the relevant component ID. Further, and optionally, in Step 1906, other metadata, that may or may not be pertinent to the component, is obtained. By way of examples, the other obtained metadata may include, but is not limited to: a parent component ID associated with a parent component of the component, one or more dependent component IDs associated with one or more dependent or child components of the component, and information detailing an installation order sequence for the component.

In Step 1908, a CCF is generated using at least a portion of the component metadata set (obtained in Step 1904) and the other metadata, if any (obtained in Step 1906). Specifically, in one embodiment of the invention, generation of the CCF may entail submitting the component metadata set and other metadata through a hash function, which may employ any combination of existing and/or future developed cryptographic algorithms. As such, the CCF may be a hash value, a hash code, or a digest outputted by the hash function given the component metadata set and other metadata as input. CCFs are described in further detail above with respect to FIG. 11.

In Step 1910, a lookup is performed on a component fingerprint repository (CFR) using the component ID (selected/obtained in Step 1900). Specifically, in one embodiment of the invention, a search may be performed throughout the CFR for one CFR entry that specifies the component ID therein. The CFR and respective CFR entries are described in further detail above with respect to FIG. 10.

Turning to FIG. 19B, in Step 1920, a determination is made as to whether a CFR entry, specifying the component ID, has been found (based on the lookup performed in Step 1910). If it is determined that a CFR entry has been identified, then the process may proceed to Step 1926. On the other hand, if it is alternatively determined that a CFR entry has not been identified, then the process may alternatively proceed to Step 1922.

In Step 1922, after determining (in Step 1920) that a CFR entry, specifying the component ID (selected/obtained in Step 1900), has not been identified (via the lookup performed in Step 1910), a new CFR entry is generated. In one embodiment of the invention, the new CFR entry may be generated using the component ID and the CCF (generated in Step 1908). Thereafter, in Step 1924, the new CFR entry (generated in Step 1922) is subsequently stored in the CFR.

In Step 1926, after determining (in Step 1920) that a CFR entry, specifying the component ID (selected/obtained in Step 1900), has indeed been identified (via the lookup performed in Step 1910), the identified CFR entry is updated. Specifically, in one embodiment of the invention, the identified CFR entry in the CFR may be updated using the CCF (generated in Step 1908). More specifically, updating the identified CFR entry may entail replacing an existing CCF, specified in the identified CFR entry, with the CCF (generated in Step 1908).

FIGS. 20A-20D show flowcharts describing a method for processing package requests in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Figure 20A:
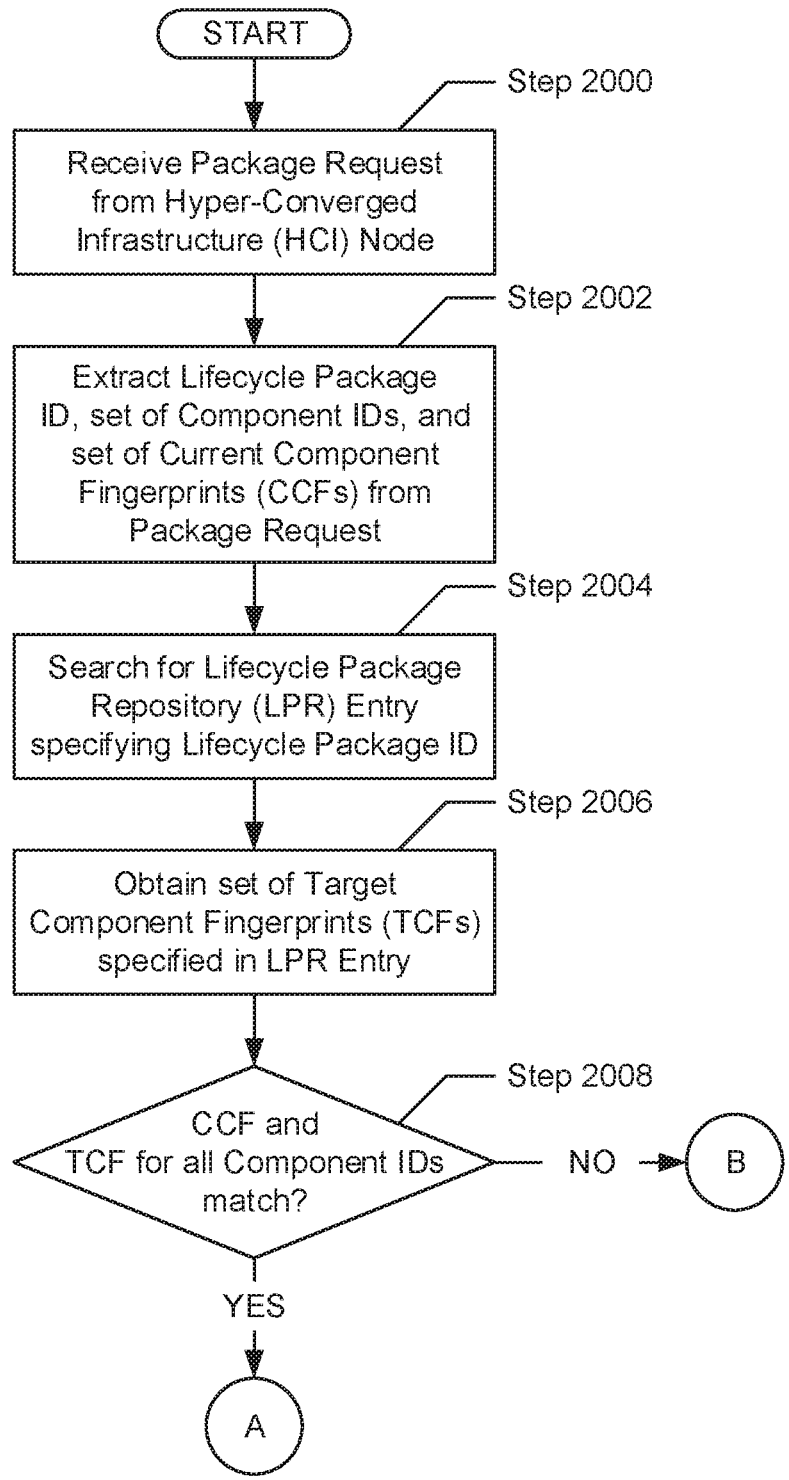
FIGS. 20A-20D show flowcharts describing a method for processing package requests in accordance with one or more embodiments of the invention.

Turning to FIG. 20A, in Step 2000, a package request is received from a hyper-converged infrastructure (HCI) node. In one embodiment of the invention, the package request may refer to a message that pertains to requesting a lifecycle package (i.e., an update, patch, and/or fix) for download. In Step 2002, items of information, specified in the package request (received in Step 2000), are extracted therefrom. In one embodiment of the invention, the extracted items of information may include a lifecycle package ID, a set of one or more component IDs, and a corresponding set of one or more current component fingerprints (CCFs). The package request and these respective items of information are described in further detail above with respect to FIG. 14.

In Step 2004, a lookup is performed on a lifecycle package repository (LPR) using the lifecycle package ID (extracted in Step 2002). Specifically, in one embodiment of the invention, a search may be performed throughout the LPR for one LPR entry that specifies the lifecycle package ID therein. The LPR and respective LPR entries are described in further detail above with respect to FIG. 5.

In Step 2006, a set of one or more target component fingerprints (TCFs), also specified in the LPR entry (identified via the lookup performed in Step 2004), is obtained. In one embodiment of the invention, each TCF may refer to a digital signature associated with a target state for a component (i.e., prerequisite component) of the lifecycle package (associated with the lifecycle package ID). A target state may refer to a required condition or version of a respective component that must be met to facilitate integration of the lifecycle package. Further, a prerequisite component may be a physical device (i.e., hardware) or a logical intelligence (i.e., software and/or firmware) that must be installed on a HCI node prior to, and in order for, the lifecycle package to install without issues.

In Step 2008, a determination is made as to whether a CCF (extracted in Step 2002) and a TCF (obtained in Step 2006), each respective to a component, and for all components (associated with the one or more component IDs extracted in Step 2002), match. If it is determined that the CCF and TCF for all components (associated with the one or more component IDs extracted in Step 2002) match, then the process may proceed to Step 2020 (see e.g., FIG. 20B). On the other hand, if it is determined that at least one CCF and TCF for any of the components (associated with the one or more component IDs extracted in Step 2002) mismatch, then the process may proceed to Step 2040 (see e.g., FIG. 20C).

Figure 20B:
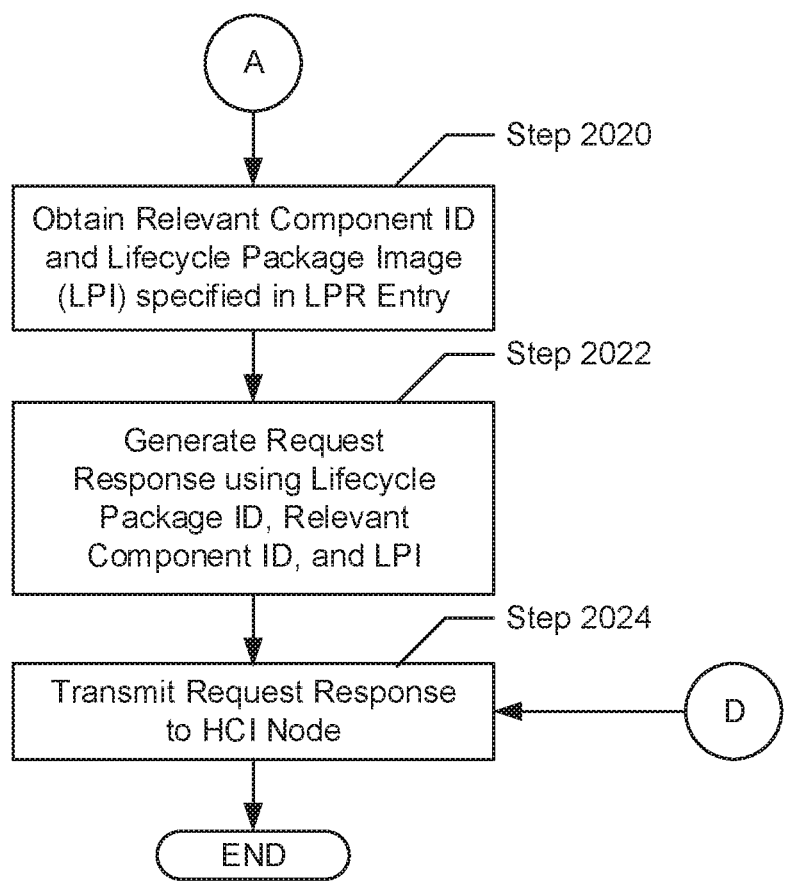

Turning to FIG. 20B, in Step 2020, after determining (in Step 2008) that the CCF and TCF for all components (associated with the one or more component IDs extracted in Step 2002) match, other items of information, specified in the LPR entry (identified via the lookup performed in Step 2004), are obtained. In one embodiment of the invention, these other items of information may include a relevant component ID and a lifecycle package image (LPI). Each of these items of information are described in further detail above with respect to FIG. 5.

In Step 2022, a request response is generated. Specifically, in one embodiment of the invention, the request response may refer to a message that pertains to a reply to a package request, which may have been submitted by a HCI node (see e.g., FIGS. 18A and 18B). Further, the request response may be generated using the lifecycle package ID (extracted in Step 2002), as well as the relevant component ID and the LPI (obtained in Step 2020). The request response is described in further detail above with respect to FIG. 15. Thereafter, in Step 2024, the request response (generated in Step 2022) is transmitted to the HCI node (i.e., an aforementioned HCI node that may have submitted a package request to which the request response is directed).

Figure 20C:
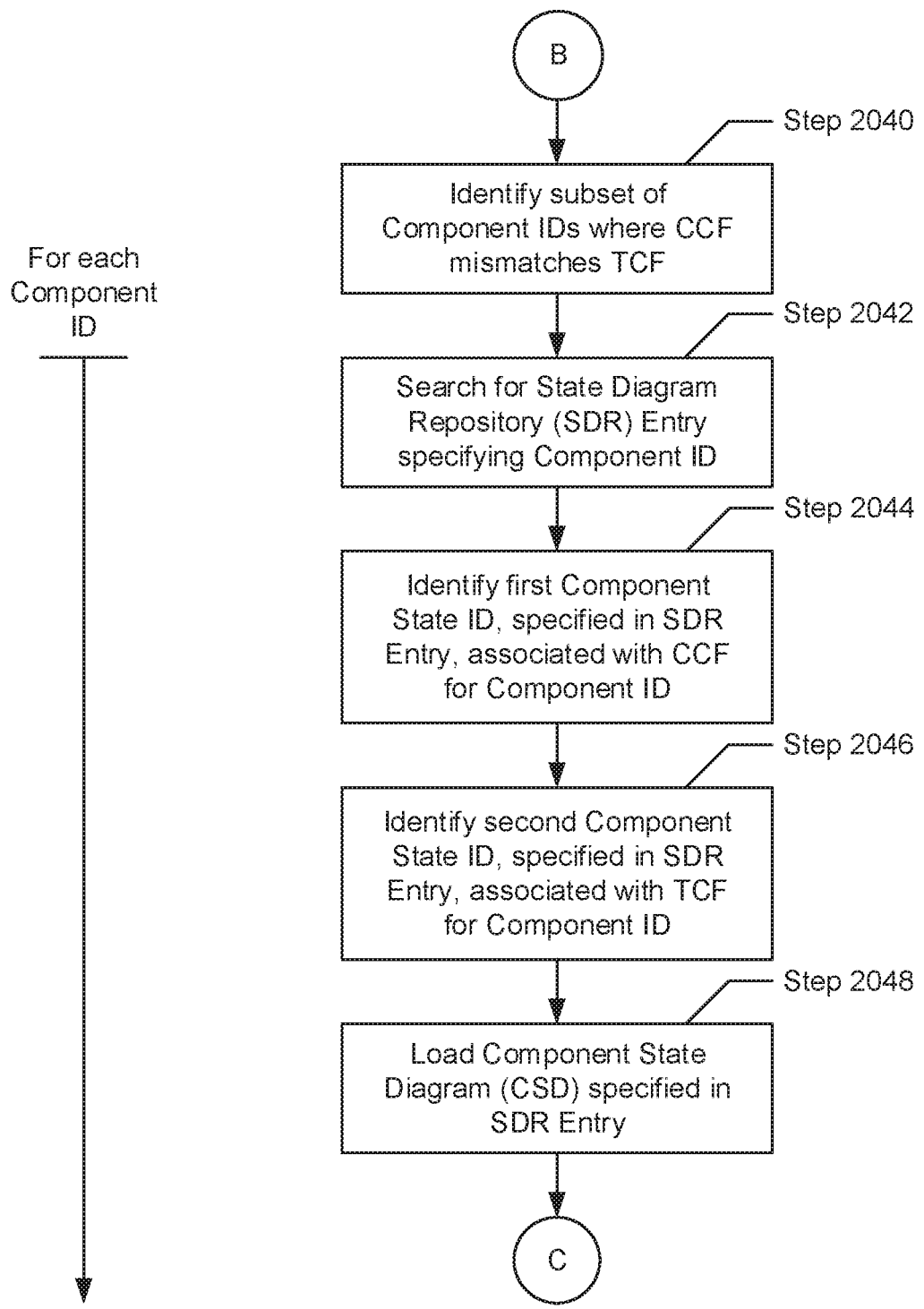

Turning to FIG. 20C, in Step 2040, after determining (in Step 2008) that at least one CCF and TCF for any of the components (associated with the one or more component IDs extracted in Step 2002) mismatches, a subset of the component IDs (extracted in Step 2002) is identified. Specifically, in one embodiment of the invention, each component ID in the subset of component IDs may pertain to a component wherein a respective CCF did not match a respective TCF. Accordingly, the subset of component IDs may pertain to components, where a current state of the component (on a HCI node) mismatches a target state of the component (required to install/apply a requested lifecycle package without issues).

In Step 2042, for each component ID (identified into the subset of component IDs in Step 2040), a lookup is performed on a state diagram repository (SDR) using the component ID. Specifically, in one embodiment of the invention, a search may be performed throughout the SDR for one SDR entry that specifies the component ID therein. The SDR and respective SDR entries are described in further detail above with respect to FIG. 4A.

In Step 2044, a first component state ID, also specified in the SDR entry (identified via the lookup performed in Step 2042), is obtained. In one embodiment of the invention, the first component state ID may associate with a first component fingerprint (also specified in the SDR entry), where the first component fingerprint matches the CCF (extracted in Step 2002) directed to a component ID (identified into the subset of component IDs in Step 2040).

In Step 2046, a second component state ID, also specified in the SDR entry (identified via the lookup performed in Step 2042), is obtained. In one embodiment of the invention, the second component state ID may associate with a second component fingerprint (also specified in the SDR entry), where the second component fingerprint matches the TCF (obtained in Step 2006) directed to a component ID (identified into the subset of component IDs in Step 2040).

In Step 2048, a component state diagram (CSD), also specified in the SDR entry (identified via the lookup performed in Step 2042), is loaded. In one embodiment of the invention, the CSD may be a state transition graph pertaining to the component (associated with the component ID specified in the SDR entry). The CSD is described in further detail above with respect to FIGS. 4A and 4B. Further, loading of the CSD may entail enabling read access to the CSD.

Figure 20D:
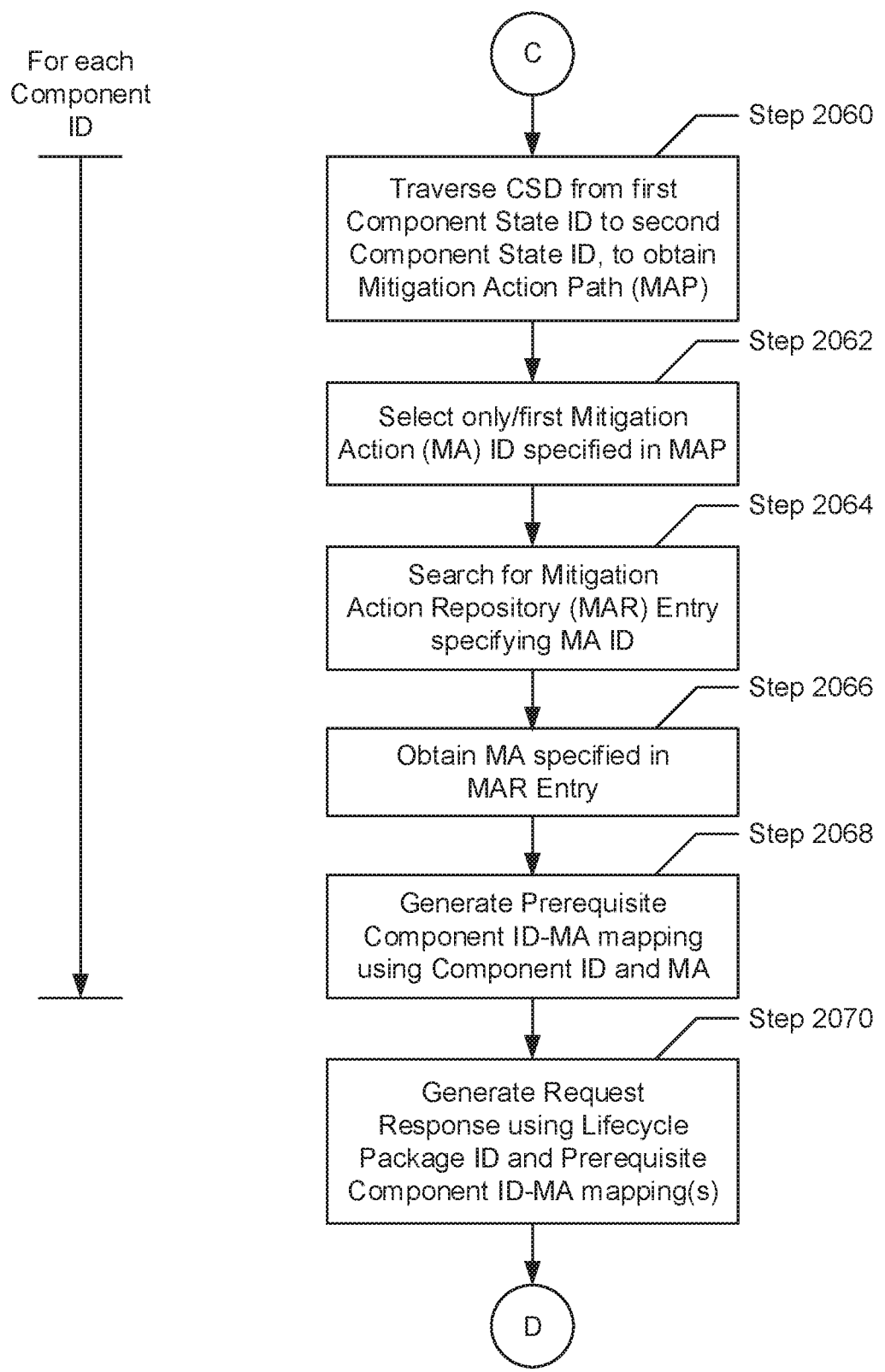

Turning to FIG. 20D, in Step 2060, a traversal of the CSD (loaded in Step 2048) is performed from a first component state ID (depicted as a first node in the CSD) (i.e., the first component state ID obtained in Step 2044) to a second component state ID (depicted as a second node in the CSD) (i.e., the second component state ID obtained in Step 2046). In one embodiment of the invention, the aforementioned traversal of the CSD may yield a mitigation action path (MAP). A MAP may refer to one or more mitigation actions (MA) IDs (depicted as one or more edges in the CSD), where the one or more edges may form a directed path from the first component state ID to the second component state ID.

In Step 2062, the MA ID (if only one MA ID forms the MAP) or a first MA ID (if multiple MA IDs form the MAP), specified in the MAP (yielded in Step 2060), is selected. In Step 2064, a lookup is performed on a mitigation action repository (MAR) using the MA ID (selected in Step 2062). Specifically, in one embodiment of the invention, a search may be performed throughout the MAR for one MAR entry that specifies the MA ID therein. The MAR and respective MAR entries are described in further detail above with respect to FIG. 6.

In Step 2066, a mitigation action (MA), also specified in the MAR entry (identified via the lookup performed in Step 2064), is obtained. In one embodiment of the invention, a MA may refer to instructions and/or data objects that facilitate the transitioning of a state of the component (identified into the subset of component IDs in Step 2040) from a first component state (associated with the first component state ID obtained in Step 2044) to: (a) a second component state (associated with the second component state ID obtained in Step 2046) (if only one MA ID formed the MAP yielded in Step 2060); or (b) an intermediate component state (between the first component state and the second component state). By way of an example, the a MA may take form as intervention instructions directed to contacting helpdesk support. These intervention instructions may specify, at least, contact information or access to a ticketing system to reach developers (described above) of the component in order to receive assistance towards transitioning the component between component states. By way of another example, a MA may take form as a data object (e.g., another lifecycle package ID (i.e., a lifecycle package ID other than the lifecycle package ID extracted in Step 2002)) and processing instructions directed to applying the other lifecycle package associated with the data object.

In Step 2068, for each component ID (identified into the subset of component IDs in Step 2040), a respective prerequisite component ID-MA mapping is generated. Specifically, each prerequisite component ID-MA may be generated using the respective component ID and the respective MA (obtained in Step 2066). In one embodiment of the invention, a prerequisite component ID-MA associates a component ID (or prerequisite component ID) to a corresponding MA.

In Step 2070, a request response is generated. Specifically, in one embodiment of the invention, the request response may refer to a message that pertains to a reply to a package request, which may have been submitted by a HCI node (see e.g., FIGS. 18A and 18B). Further, the request response may be generated using the lifecycle package ID (extracted in Step 2002) and the one or more prerequisite component ID-MA mappings (generated in Step 2068). The request response is described in further detail above with respect to FIG. 15. Thereafter, the process may proceed to Step 2024 (see e.g., FIG. 20B), where the request response (generated in Step 2070) is subsequently transmitted to the HCI node (i.e., an aforementioned HCI node that may have submitted a package request to which the request response is directed).

Figure 21A:
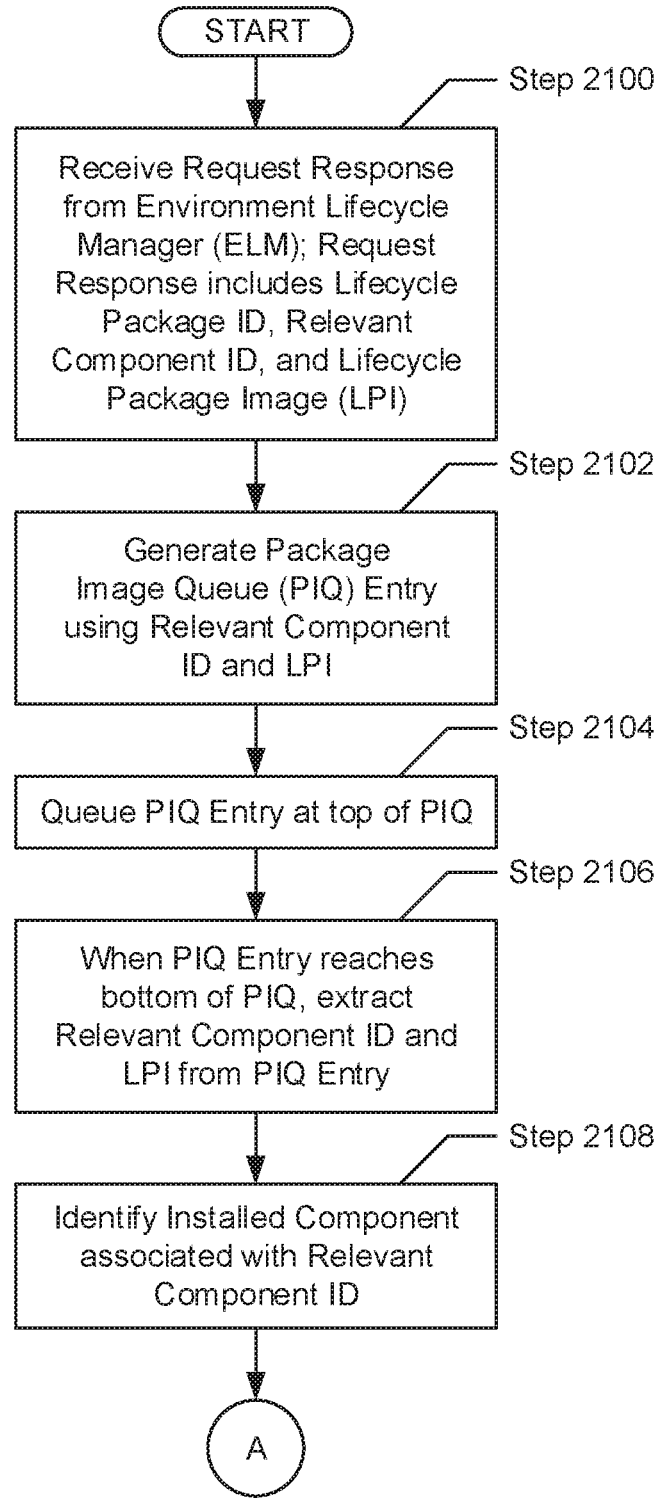
FIGS. 21A and 21B show flowcharts describing a method for processing request responses in accordance with one or more embodiments of the invention.
Figure 21B:
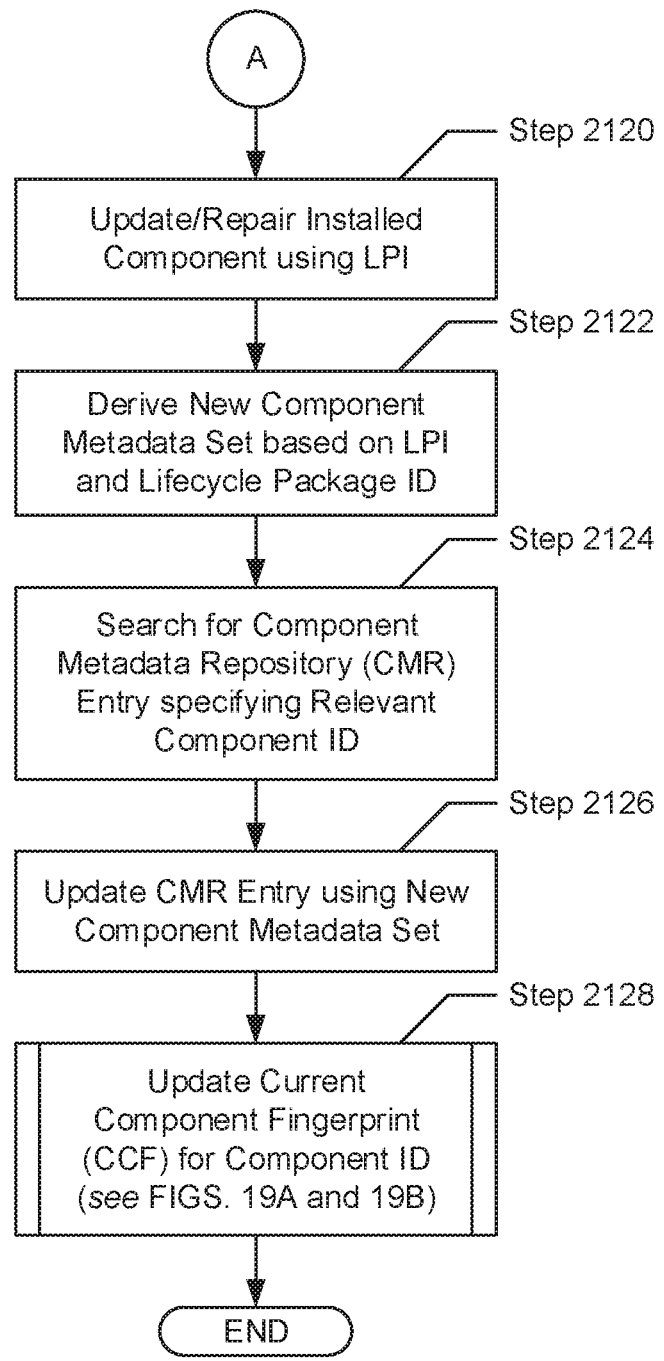

FIGS. 21A and 21B show flowcharts describing a method for processing request responses in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 21A, in Step 2100, a request response is received from an environment lifecycle manager (ELM) (see e.g., FIG. 2). In one embodiment of the invention, the request response may refer to a message that pertains to a reply to a package request, which may have been submitted by the HCI node (substantively performing the various steps outlined in FIGS. 21A and 21B) (see e.g., FIGS. 18A and 18B). Further, the request response may include a lifecycle package ID, a relevant component ID, and lifecycle package image (LPI). The request response and these aforementioned items of information are described in further detail above with respect to FIG. 15.

In Step 2102, a package image queue (PIQ) entry is generated. Specifically, in one embodiment of the invention, the PIQ entry may be generated using the relevant component ID and the LPI (obtained via receiving the request response in Step 2100). Thereafter, in Step 2104, the PIQ entry (generated in Step 2102) is queued at a topmost position of a PIQ. In one embodiment of the invention, the PIQ may be a data structure that resembles a first in, first out (FIFO) queue, which buffers one or more LPIs that may be awaiting installation or application onto their respective components. The PIQ is described in further detail above with respect to FIG. 8.

In Step 2106, after one or more previously queued PIQ entries is/are processed (and discarded from the PIQ), the PIQ entry (generated in Step 2102) arrives at a bottommost position of the PIQ. In one embodiment of the invention, upon reaching the bottommost position, the items of information (i.e., the relevant component ID and LPI), specified in the PIQ entry, are extracted. In Step 2108, a component (installed on the HCI node) is identified. Specifically, in one embodiment of the invention, the installed component may be identified using the relevant component ID (extracted in Step 2106), where a component ID associated with the installed component may match the relevant component ID.

Turning to FIG. 21B, in Step 2120, the LPI (extracted in Step 2106) is installed/applied. In on embodiment of the invention, the LPI may encompass any and all information necessary to implement the upgrade, patch, and/or fix to which the LPI is directed. For example, the LPI may encompass one or more binary files, representative of computer readable program code that may be interpreted and executed by a component, as well as lifecycle package metadata (entailing descriptive information pertaining to the lifecycle package with which the LPI is associated). Furthermore, in one embodiment of the invention, the LPI may be installed or applied onto the component (identified in Step 2108) towards upgrading, patching, and/or repairing the component.

In Step 2122, a new component metadata set is derived. In one embodiment of the invention, the new component metadata set may include one or more items of metadata pertinent to the component (recently upgraded, patched, and/or repaired in Step 2120). Further, the new component metadata set may be derived based on at least a portion of the LPI (extracted in Step 2106) and the lifecycle package ID (obtained via receiving the request response in Step 2100). With respect to the LPI, the new component metadata set may encompass at least a portion of the above-mentioned lifecycle package metadata, specified in the LPI, which may entail descriptive information pertaining to the lifecycle package with which the LPI is associated. Component metadata is described in further detail above with respect to FIG. 11.

In Step 2124, a lookup is performed on a component metadata repository (CMR) using the relevant component ID (obtained via receiving the request response in Step 2100). Specifically, in one embodiment of the invention, a search may be performed throughout the CMR for one CMR entry that specifies the relevant component ID therein. The CMR and respective CMR entries are described in further detail above with respect to FIG. 9.

In Step 2126, the CMR entry (identified via the lookup performed in Step 2124) is updated. Specifically, in one embodiment of the invention, the CMR entry may be updated using the new component metadata set (derived in Step 2122). Further, updating of the CMR entry may entail replacing an existing component metadata set, specified in the CMR entry, with the new component metadata set. In Step 2128, a current component fingerprint (CCF) for the component (recently upgraded, patched, and/or repaired in Step 2120) is updated. The process entailing generation of the CCF is described in further detail above with respect to FIGS. 19A and 19B.

Figure 22:
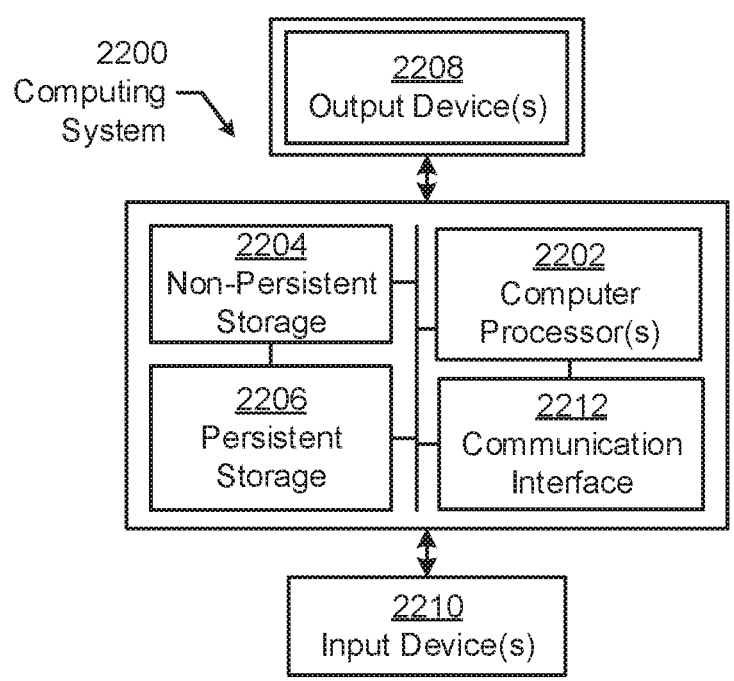
FIG. 22 shows a computing system in accordance with one or more embodiments of the invention.

FIG. 22 shows a computing system in accordance with one or more embodiments of the invention. The computing system (2200) may include one or more computer processors (2202), non-persistent storage (2204) (e.g., volatile memory, such as random access memory (RAM), cache memory), persistent storage (2206) (e.g., a hard disk, an optical drive such as a compact disk (CD) drive or digital versatile disk (DVD) drive, a flash memory, etc.), a communication interface (2212) (e.g., Bluetooth interface, infrared interface, network interface, optical interface, etc.), input devices (2210), output devices (2208), and numerous other elements (not shown) and functionalities. Each of these components is described below.

In one embodiment of the invention, the computer processor(s) (2202) may be an integrated circuit for processing instructions. For example, the computer processor(s) may be one or more cores or micro-cores of a processor. The computing system (2200) may also include one or more input devices (2210), such as a touchscreen, keyboard, mouse, microphone, touchpad, electronic pen, or any other type of input device. Further, the communication interface (2212) may include an integrated circuit for connecting the computing system (2200) to a network (not shown) (e.g., a local area network (LAN), a wide area network (WAN) such as the Internet, mobile network, or any other type of network) and/or to another device, such as another computing device.

In one embodiment of the invention, the computing system (2200) may include one or more output devices (2208), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (2202), non-persistent storage (2204), and persistent storage (2206). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing package requests, comprising:
receiving, from a hyper-converged infrastructure (HCI) node, a first package request comprising a first lifecycle package identifier (ID), a first component ID, and a first current component fingerprint (CCF);
performing a first lookup on a lifecycle package repository (LPR) using the first lifecycle package ID, to identify a first LPR entry;
obtaining, from the first LPR entry, a first target component fingerprint (TCF) specified therein, wherein the first TCF is associated with the first component ID;
making a first determination that the first CCF matches the first TCF;
based on the first determination:
obtaining, from the first LPR entry, a first relevant component ID and a first lifecycle package image (LPI);
generating, directed to the first package request, a first request response comprising the first lifecycle package ID, the first relevant component ID, and the first LPI; and
transmitting the first request response to the HCI node,
wherein the first CCF is associated with the first component ID,
wherein the first CCF is based on at least one selected from a group consisting of a parent component ID associated with a parent component of the first component ID and a dependent component ID associated with a dependent component of the first component ID.

2. The method of claim 1, wherein the first TCF is a digital signature representative of a target state of a component installed on the HCI node.

3. The method of claim 2, wherein the target state of the component installed on the HCI node pertains to a prerequisite state in which the component must be for compatibility with the first LPI.

4. The method of claim 1, further comprising:
receiving, from the HCI node, a second package request comprising a second lifecycle package ID, a second component ID, and a second CCF;
performing a second lookup on the LPR using the second lifecycle package ID, to identify a second LPR entry;
obtaining, from the second LPR entry, a second TCF specified therein, wherein the second TCF is associated with the second component ID;
making a second determination that the second CCF mismatches the second TCF;
based on the second determination:
performing a third lookup on a state diagram repository (SDR) using the second component ID, to identify a SDR entry;
obtaining, from the SDR entry, a first component state ID associated with a first component fingerprint, wherein the first component fingerprint matches the second CCF;
obtaining, from the SDR entry, a second component state ID associated with a second component fingerprint, wherein the second component fingerprint matches the second TCF;
obtaining, from the SDR entry, a component state diagram (CSD) specified therein; and
traversing the CSD from a first node depicted therein, associated with the first component state ID, to a second node depicted therein, associated with the second component state ID, to obtain a mitigation action path (MAP) comprising a mitigation action (MA) ID associated with a MA.

5. The method of claim 4, wherein the CSD is a state transition graph that depicts a lifecycle management (LCM) history for a component installed on the HCI node and associated with the second component ID.

6. The method of claim 4, further comprising:
performing a fourth lookup on a mitigation action repository (MAR) using the MA ID, to identify a MAR entry;
obtaining, from the MAR entry, the MA;
generating a prerequisite component ID-MA mapping using the second component ID and the MA;
generating, directed to the second package request, a second request response comprising the second lifecycle package ID and the prerequisite component ID-MA mapping; and
transmitting the second request response to the HCI node.

7. The method of claim 6, wherein the MA comprises instructions directed to contacting helpdesk support.

8. The method of claim 6, wherein the MA comprises a third lifecycle package ID.

9. A system, comprising:
a lifecycle manager agent (LMA);
a lifecycle package repository (LPR) stored in a storage medium and directed to consolidating lifecycle packages; and
a hyper-converged infrastructure (HCI) nodes agent (HNA) comprising a processor and storage and operatively connected to the LPR and the LMA, and programmed to:
receive, from the LMA, a first package request comprising a first lifecycle package identifier (ID), a first component ID, and a first current component fingerprint (CCF);

perform a first lookup on the LPR using the first lifecycle package ID, to identify a first LPR entry;

obtain, from the first LPR entry, a first target component fingerprint (TCF) specified therein, wherein the first TCF is associated with the first component ID;

make a first determination that the first CCF matches the first TCF;

based on the first determination:
obtain, from the first LPR entry, a first relevant component ID and a first lifecycle package image (LPI);
generate, directed to the first package request, a first request response comprising the first lifecycle package ID, the first relevant component ID, and the first LPI; and
transmit the first request response to the LMA, wherein the first CCF is associated with the first component ID, wherein the first CCF is based on at least one selected from a group consisting of a parent component ID associated with a parent component of the first component ID and a dependent component ID associated with a dependent component of the first component ID.

10. The system of claim 9, wherein a lifecycle package of the lifecycle packages is associated with the first lifecycle package ID, wherein the lifecycle package is one selected from a group consisting of an upgrade and a patch, for a component associated with the first component ID.

11. The system of claim 9, further comprising:
a state diagram repository (SDR) directed to consolidating component state diagrams (CSDs),
wherein the HNA is further operatively connected to the SDR.

12. The system of claim 11, further comprising:
a mitigation action repository (MAR) directed to consolidating mitigation actions (MAs),
wherein the HNA is further operatively connected to the MAR.

13. The system of claim 12, further comprising:
a node component repository (NCR) directed to consolidating node-component mappings,
wherein the HNA is further operatively connected to the NCR.

14. The system of claim 13, further comprising:
an environment lifecycle manager (ELM) comprising the HNA, the LPR, the SDR, the MAR, and the NCR.

15. The system of claim 14, further comprising:
a hyper-converged infrastructure (HCI) cluster comprising a plurality of HCI nodes,
wherein the ELM is operatively connected to the HCI cluster,
wherein the HNA interacts with the HCI cluster, and
wherein the LMA resides on each HCI node of the plurality of HCI nodes.

16. The system of claim 15, further comprising:
an environment administrator client (EAC) operatively connected the HCI cluster.

17. The system of claim 15, further comprising:
a HCI environment comprising the ELM and the HCI cluster.

18. The system of claim 14, further comprising:
a package aggregator and distributor (PAD) operatively connected to the ELM,
wherein the ELM further comprises an aggregator and distributor agent (ADA) programmed to interact with the PAD.

19. A non-transitory computer readable medium (CRM) comprising computer readable program code, which when executed by a computer processor, enables the computer processor to:
receive, from a hyper-converged infrastructure (HCI) node, a first package request comprising a first lifecycle package identifier (ID), a first component ID, and a first current component fingerprint (CCF);
perform a first lookup on a lifecycle package repository (LPR) using the first lifecycle package ID, to identify a first LPR entry;
obtain, from the first LPR entry, a first target component fingerprint (TCF) specified therein, wherein the first TCF is associated with the first component ID;
make a first determination that the first CCF matches the first TCF;
based on the first determination:
obtain, from the first LPR entry, a first relevant component ID and a first lifecycle package image (LPI);
generate, directed to the first package request, a first request response comprising the first lifecycle package ID, the first relevant component ID, and the first LPI; and
transmit the first request response to the HCI node,
wherein the first CCF is associated with the first component ID,
wherein the first CCF is based on at least one selected from a group consisting of a parent component ID associated with a parent component of the first component ID and a dependent component ID associated with a dependent component of the first component ID.

* * * * *

UNITED STATES PATENT AND TRADEMARK OFFICE
CERTIFICATE OF CORRECTION

PATENT NO. : 10,698,677 B2
APPLICATION NO. : 15/971343
DATED : June 30, 2020
INVENTOR(S) : Mace et al.

Page 1 of 1

It is certified that error appears in the above-identified patent and that said Letters Patent is hereby corrected as shown below:

In the Claims

Column 36, Line 8, in Claim 16, the phrase "connected the HCI cluster" should read -- connected to the HCI cluster --.

Signed and Sealed this
First Day of September, 2020

Andrei Iancu
*Director of the United States Patent and Trademark Office*